(12) United States Patent
Goto et al.

(10) Patent No.: US 10,259,438 B2
(45) Date of Patent: Apr. 16, 2019

(54) BRAKE CONTROL DEVICE

(71) Applicant: HITACHI AUTOMOTIVE SYSTEMS, LTD., Ibaraki (JP)

(72) Inventors: Daisuke Goto, Atsugi (JP); Norikazu Matsuzaki, Atsugi (JP)

(73) Assignee: HITACHI AUTOMOTIVE SYSTEMS, LTD., Ibaraki (JP)

(*) Notice: Subject to any disclaimer, the term of this patent is extended or adjusted under 35 U.S.C. 154(b) by 0 days.

(21) Appl. No.: 15/512,932

(22) PCT Filed: Mar. 18, 2016

(86) PCT No.: PCT/JP2016/058742
§ 371 (c)(1),
(2) Date: Mar. 21, 2017

(87) PCT Pub. No.: WO2016/158508
PCT Pub. Date: Oct. 6, 2016

(65) Prior Publication Data
US 2017/0297547 A1    Oct. 19, 2017

(30) Foreign Application Priority Data

Mar. 31, 2015   (JP) .................. 2015-073998

(51) Int. Cl.
*B60T 7/04*    (2006.01)
*B60T 7/12*    (2006.01)
(Continued)

(52) U.S. Cl.
CPC ............ *B60T 13/662* (2013.01); *B60T 7/042* (2013.01); *B60T 7/12* (2013.01); *B60T 7/22* (2013.01);
(Continued)

(58) Field of Classification Search
CPC .......... B60T 13/662; B60T 7/042; B60T 7/12; B60T 8/172; B60T 13/745; B60T 2220/04
See application file for complete search history.

(56) References Cited

U.S. PATENT DOCUMENTS 6,742,850 B1 * 6/2004 Eckert ................... B60T 7/042
                                                     180/170
2011/0246041 A1 * 10/2011 Kato ..................... B60T 8/1755
                                                      701/70

FOREIGN PATENT DOCUMENTS

| JP | 2002-225689 | 8/2002 |
| JP | 2007-1516   | 1/2007 |
| JP | 2007-118880 | 5/2007 |

OTHER PUBLICATIONS

International Search Report dated Jun. 7, 2016 in International Application No. PCT/JP2016/058742.

* cited by examiner

*Primary Examiner* — Aaron L Troost
(74) *Attorney, Agent, or Firm* — Wenderoth, Lind & Ponack, L.L.P.

(57) ABSTRACT

A brake control device capable of suppressing a sense of discomfort felt by a driver. The brake control device (31) includes a braking command addition part (34A) for adding an automatic-brake braking command value (B) output from an automatic-brake braking command calculation part (32) and a pedal operation braking command value (A) output from a pedal operation braking command calculation part (34B). The pedal operation braking command calculation part includes a pedal operation braking command selection part (34B1), a normal brake characteristic part (34B2) for holding a normal brake characteristic, and an automatic brake characteristic part (34B3) for holding an automatic brake characteristic. The pedal operation braking command
(Continued)

selection part selects a braking command value output from the automatic brake characteristic part when the automatic-brake braking command value is more than 0, and outputs the selection result to the braking command addition part as the pedal operation braking command value.

14 Claims, 10 Drawing Sheets

(51) Int. Cl.
*B60T 7/22* (2006.01)
*B60T 8/00* (2006.01)
*B60T 13/66* (2006.01)
*B60T 13/74* (2006.01)
*B60T 8/172* (2006.01)

(52) U.S. Cl.
CPC ............... *B60T 8/00* (2013.01); *B60T 8/172* (2013.01); *B60T 13/74* (2013.01); *B60T 13/745* (2013.01); *B60T 2201/022* (2013.01); *B60T 2220/04* (2013.01)

BRAKE CONTROL DEVICE

TECHNICAL FIELD

The present invention relates to a brake control device for applying a braking force to a vehicle.

BACKGROUND ART

As a brake control device installed in a vehicle, for example, a motor vehicle, there is known a configuration for automatically applying a braking force (automatic brake) independently of a brake pedal operation by a driver when a predetermined condition is satisfied (Patent Literature 1). On this occasion, the brake control device disclosed in Patent Literature 1 is configured to compare a braking command value for automatic brake and a braking command value corresponding to a brake pedal operation amount with each other when a brake pedal is operated by the driver during the automatic brake, and apply a braking force corresponding to a larger one of the braking command values.

CITATION LIST

Patent Literature

PTL 1: JP 2007-118880 A

SUMMARY OF INVENTION

Technical Problem

However, the configuration disclosed in Patent Literature 1 may cause a driver to feel a sense of discomfort when the driver operates the brake pedal during the automatic brake.

The present invention has an object to provide a brake control device capable of suppressing a sense of discomfort felt by a driver.

Solution to Problem

In order to solve the above-mentioned problem, according to one embodiment of the present invention, there is provided a brake control device for controlling an electric actuator in accordance with at least one of a braking command value generated by an operation on a brake pedal and a braking command value for automatic brake in accordance with a vehicle state, thereby applying a braking force to a wheel, the brake control device including, as characteristics of the braking command value corresponding to an operation amount of the brake pedal, a normal brake characteristic and an automatic brake characteristic having a smaller braking command value corresponding to the operation amount than a braking command value of the normal brake characteristic, in which, when a stepping operation is carried out on the brake pedal during the automatic brake, a braking command value based on the automatic brake characteristic is added to the braking command value for the automatic brake, and the electric actuator is controlled so as to output a braking force accompanying the operation on the brake pedal in accordance with a result of the addition.

Advantageous Effect of Invention

According to the present invention, a sense of discomfort felt by the driver can be suppressed.

DESCRIPTION OF EMBODIMENTS

Referring to the accompanying drawings, a detailed description is now given of a brake control device according to embodiments of the present invention while exemplifying a case where the brake control device is installed in a four-wheel motor vehicle.

Figure 1:
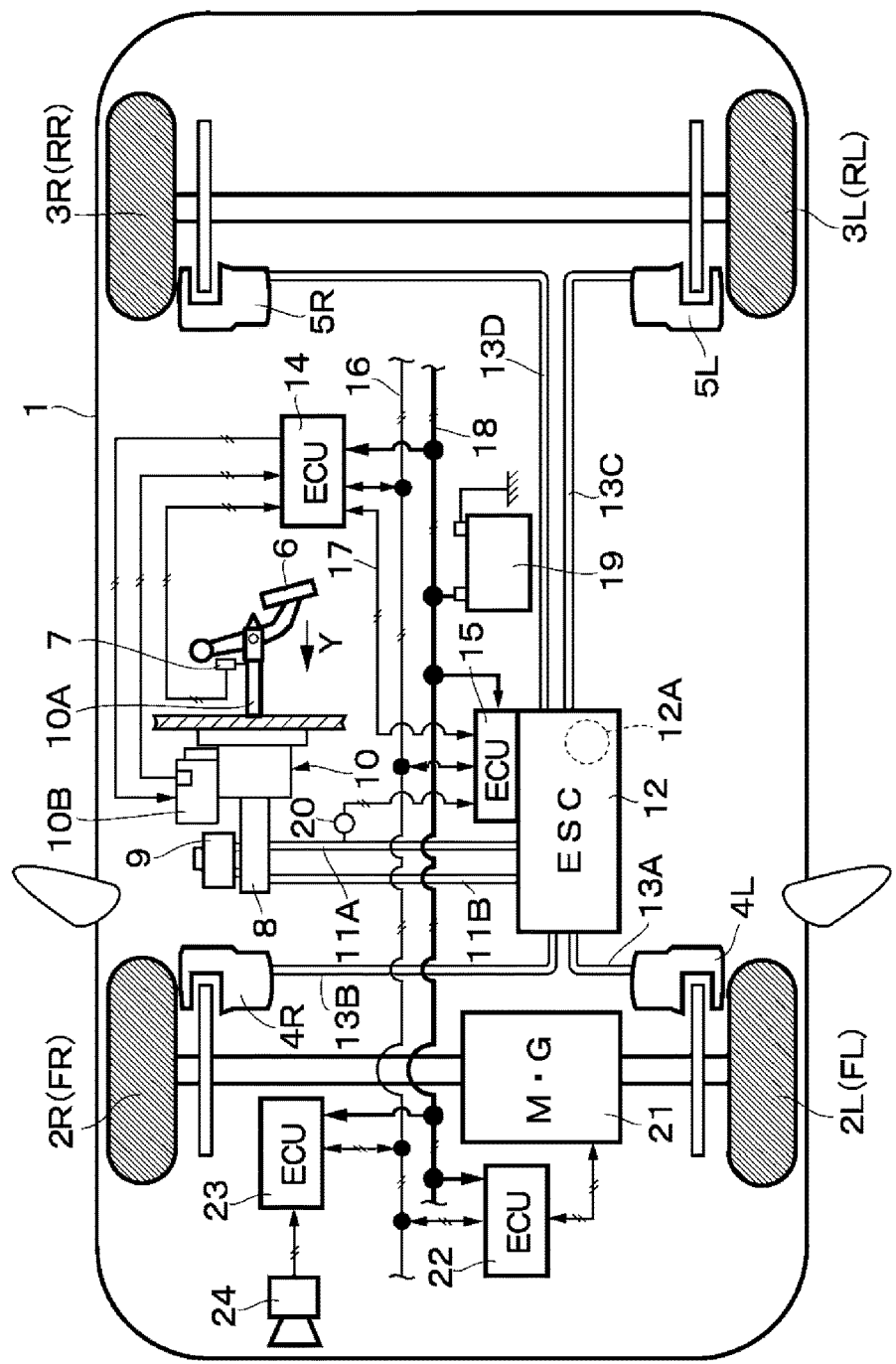
FIG. 1 is a schematic diagram for illustrating a vehicle in which a brake control device according to a first embodiment of the present invention is installed.

FIG. 1 to FIG. 6 are illustrations of a first embodiment of the present invention. In FIG. 1, a total of four wheels constructed by front left and right wheels 2L and 2R and rear left and right wheels 3L and 3R are provided on a bottom side (a road surface side) of a vehicle body 1 constructing a body of the vehicle. Front-wheel-side wheel cylinders 4L and 4R are provided respectively for the front left and right wheels 2L and 2R. Rear-wheel-side wheel cylinders 5L and 5R are provided respectively for the rear left and right wheels 3L and 3R. Those respective wheel cylinders 4L, 4R, 5L, and 5R serve as wheel brake mechanisms for applying braking forces to the respective wheels 2L, 2R, 3L, and 3R, and are constructed by, for example, hydraulic disc brakes or drum brakes.

A brake pedal 6 is provided on a dashboard side of the vehicle body 1. The brake pedal 6 is configured to receive a stepping operation in a direction indicated by an arrow Y by a driver during the brake operation of the vehicle. The respective wheel cylinders 4L, 4R, 5L, and 5R apply braking forces to the wheels 2L, 2R, 3L, and 3R based on this operation. An operation amount detector 7 for detecting the brake operation amount (pedal operation amount) by the driver is provided on the brake pedal 6 (more specifically, an input rod 10A of an electric booster 10).

The operation amount detector 7 serves as a brake pedal operation amount detector 33 (refer to FIG. 2) described later. As the operation amount detector 7, a stroke sensor (displacement sensor) for detecting a stroke amount (pedal stroke) of, for example, the brake pedal 6 (input rod 10A). The operation amount detector 7 is not limited to the stroke sensor, and various sensors capable of detecting the operation amount of the brake pedal 6 (input rod 10A), for example, a force sensor for detecting a pedal stepping force and an angle sensor for detecting a rotation angle of the brake pedal 6 may be used. In this case, the operation amount detector 7 may be constructed by one (one type of) sensor, or a plurality of sensors (a plurality of types of sensors).

A detection signal (brake operation amount) of the operation amount detector 7 is output to a first ECU 14 and to a vehicle data bus 16 via the first ECU 14. Further, the detection signal of the operation amount detector 7 is output to a second ECU 15 via, for example, a communication line 17 for connecting the first ECU 14 and the second ECU 15 to each other.

When the stepping operation is applied to the brake pedal 6, a brake hydraulic pressure is generated in a master cylinder 8 via the electric booster 10. Specifically, the stepping operation on the brake pedal 6 is transmitted to the master cylinder 8 via the electric booster 10, thereby generating the brake hydraulic pressure in hydraulic pressure chambers (not shown) in the master cylinder 8. A reservoir 9 serving as a working fluid tank for storing brake fluid inside is provided to the master cylinder 8. The reservoir 9 is configured to supply/discharge the brake fluid to/from the hydraulic chambers inside the master cylinder 8.

The electric booster 10 serving as an electric actuator is provided between the brake pedal 6 and the master cylinder 8. The electric booster 10 serves as a boost mechanism for boosting the stepping force (brake operation force) when the stepping operation is applied to the brake pedal 6, and transmitting the boosted stepping force to the master cylinder 8. The brake hydraulic pressure generated inside the master cylinder 8 is transmitted to a hydraulic pressure supply device 12 via, for example, a pair of cylinder-side hydraulic pressure pipes 11A and 11B.

The hydraulic pressure supply device 12 is configured to distribute the hydraulic pressure from the master cylinder 8 to the respective wheel cylinders 4L, 4R, 5L, and 5R via brake-side pipe portions 13A, 13B, 13C, and 13D. As a result, braking forces can be applied to the respective wheels 2L, 2R, 3L, and 3R independently of one another. A mechanism for generating the hydraulic pressure by the brake pedal 6 is not limited to the above-mentioned configuration, and may be a mechanism for generating the hydraulic pressure in accordance with the operation on the brake pedal 6, for example, a brake-by-wire mechanism.

The electric booster 10 includes the input rod 10A connected to the brake pedal 6, a booster piston (not shown) capable of adjusting (increasing/decreasing) the pressure (brake fluid pressure) inside the master cylinder 8, and an electric motor 10B for driving the booster piston. The electric booster 10 is configured to adjust the pressure (master cylinder pressure) inside the master cylinder 8 by the booster piston based on the drive by the electric motor 10B, thereby adjusting (increasing/decreasing) the pressures (wheel cylinder pressures) inside the wheel cylinders 4L, 4R, 5L, and 5R.

For example, the electric booster 10 drives the electric motor 10B in accordance with the brake operation amount (stepping amount) by the driver, thereby increasing the pressure in the master cylinder 8 by the booster piston. As a result, the electric booster 10 can increase the operation force (stepping force) on the brake pedal 6 by the driver, thereby increasing the pressures inside the wheel cylinders 4L, 4R, 5L, and 5R.

Further, the electric booster 10 serves as an automatic brake application mechanism for applying a braking force (automatic brake) in accordance with an operation state of the vehicle and an external environment, namely, a vehicle state, even without the brake operation by the driver. In other words, as described later, the electric booster 10 is configured to drive the electric motor 10B in accordance with a command (automatic brake command) to apply the automatic brake, thereby generating a hydraulic pressure inside the master cylinder 8 by the booster piston. As a result, the electric booster 10 can increase the pressures inside the respective wheel cylinders 4L, 4R, 5L, and 5R in accordance with the automatic brake command, thereby applying the braking force (automatic brake) independently of the brake operation by the driver (independently of whether or not the operation is carried out).

The electric booster 10 is configured to drive the electric motor 10B based on a command (drive current) from the first ECU 14, thereby variably controlling the brake hydraulic pressure generated inside the master cylinder 8. In other words, the electric booster 10 is connected to the first ECU 14, and is controlled by the first ECU 14. The first ECU 14 is constructed by, for example, a microcomputer, and serves as an electric booster control unit for electrically controlling the drive of (the electric motor 10B of) the electric booster 10.

An input side of the first ECU 14 is connected to the operation amount detector 7 for detecting the operation amount of the brake pedal 6, the vehicle data bus 16 for transmitting/receiving signals to/from ECUs 22 and 23 of other vehicle devices, and the communication line 17 for communicating to/from the second ECU 15. The vehicle data bus 16 is a serial communication part called V-CAN installed in the vehicle, and is configured to carry out multiplex communication among a large number of electronic devices installed in the vehicle. Further, electric power is supplied from an in-vehicle battery 19 to the first ECU 14 via an in-vehicle power supply line 18. The second to fourth ECUs 15, 22, and 23 described later are, similarly to the first ECU 14, also connected to the power supply line 18 so that those ECUs are supplied with electric power from the in-vehicle battery 19 via the power supply line 18.

On the other hand, an output side of the first ECU 14 is connected to the electric motor 10B, the vehicle data bus 16, and the communication line 17. The first ECU 14 is configured to control the electric booster 10 in accordance with the detection signal (pedal operation amount) output from the operation amount detector 7, and a command signal (automatic-brake braking command value) for the automatic brake output from an automatic-brake braking command calculation part 32 (refer to FIG. 2) described later. In other words, the first ECU 14 drives the electric motor 10B in accordance with the pedal operation amount and the automatic-brake braking command value, thereby variably controlling the brake hydraulic pressure to be generated inside the master cylinder 8 by the booster piston. The control of the electric booster 10 by the first ECU 14 is described in detail later.

A hydraulic pressure sensor 20 is provided to the cylinder-side hydraulic pressure pipe 11A. The hydraulic pressure sensor 20 is configured to detect the pressure (brake pressure) generated in the master cylinder 8, more specifically, the hydraulic pressure inside the cylinder-side hydraulic pressure pipe 11A. The hydraulic pressure sensor 20 is electrically connected to the second ECU 15, and a detection signal of the hydraulic pressure sensor 20 can be transmitted from the second ECU 15 to the first ECU 14 via the communication line 17. In FIG. 1, the hydraulic pressure sensor 20 is connected only to the second ECU 15, but the hydraulic pressure sensor 20 may also be connected to the first ECU 14, that is, may be connected to the first ECU 14 and the second ECU 15.

The hydraulic pressure supply device 12 (hereinafter referred to as ESC 12) serving as an electric actuator is provided between the wheel cylinders 4L, 4R, 5L, and 5R and the master cylinder 8. The ESC 12 is configured to variably control the brake hydraulic pressure generated inside the master cylinder 8 as the wheel cylinder pressures (W/C pressures) for the respective wheels 2L, 2R, 3L, and 3R, and individually supply the wheel cylinder pressures to the wheel cylinders 4L, 4R, 5L, and 5R. In other words, the ESC 12 is configured to distribute and supply the hydraulic pressure output from the master cylinder 8 via the cylinder-side hydraulic pressure pipes 11A and 11B to the wheel cylinders 4L, 4R, 5L, and 5R via the brake-side pipe portions 13A, 13B, 13C, and 13D.

On this occasion, the ESC 12 is constructed by a plurality of control valves (not shown), hydraulic pumps for increasing the brake hydraulic pressure (not shown), the electric motor 12A for driving the hydraulic pumps, and a hydraulic pressure control reservoir (not shown) for temporarily storing surplus brake fluid. Opening/closing of each of the control valves and the drive of the electric motor 12A of the ESC 12 are controlled by the second ECU 15.

The second ECU 15 is constructed by, for example, a microcomputer, and serves as a hydraulic pressure supply device control unit for electrically controlling the drive of (the respective control valves and the electric motor 12A of) the ESC 12. An input side of the second ECU 15 is connected to the hydraulic pressure sensors 20, the vehicle data bus 16, and the communication line 17. An output side of the second ECU 15 is connected to the respective control valves, the electric motor 12A, the vehicle data bus 16, and the communication line 17.

The second ECU 15 is configured to individually control the drive of the respective control valves and the electric motor 12A of the ESC 12. As a result, the second ECU 15 carries out the control of decreasing, maintaining, or increasing, or pressurizing the brake hydraulic pressure supplied from the brake-side pipe portions 13A, 13B, 13C, and 13D to the wheel cylinders 4L, 4R, 5L, and 5R individually for each of the wheel cylinders 4L, 4R, 5L, and 5R.

In this case, the second ECU 15 may carry out the operation control for the ESC 12, thereby carrying out, for example, the following pieces of control (1) to (8). (1) Braking force distribution control of appropriately distributing the braking force to the respective wheels 2L, 2R, 3L, and 3R in accordance with a vertical load or the like during the braking of the vehicle. (2) Antilock brake control of automatically adjusting the braking forces of the respective wheels 2L, 2R, 3L, and 3R during the braking, thereby preventing the respective wheels 2L, 2R, 3L, and 3R from being locked (slipping). (3) Vehicle stabilization control of detecting skidding of the respective wheels 2L, 2R, 3L, and 3R during the travel, and suppressing the understeer and the oversteer while automatically controlling as needed the braking forces applied to the respective wheels 2L, 2R, 3L, and 3R independently of the operation amount of the brake pedal 6, thereby stabilizing behavior of the vehicle. (4) Hill start assistance control of assisting start by holding a braking state on a hill (particularly on an uphill). (5) Traction control of preventing the respective wheels 2L, 2R, 3L, and 3R from idling during start or the like. (6) Vehicle following control of maintaining a constant inter-vehicle distance to a preceding vehicle. (7) Lane departure prevention control of keeping the vehicle within a travel lane. (8) Obstacle avoidance control of avoiding collision with an obstacle forward or backward of the vehicle.

During the normal operation by the driver's brake operation, the ESC 12 directly supplies the hydraulic pressure generated in the master cylinder 8 by the electric booster 10 to the wheel cylinders 4L, 4R, 5L, and 5R. For example, when the antilock brake control or the like is carried out, the pressure increase control valves are closed so as to maintain the hydraulic pressure in the wheel cylinders 4L, 4R, 5L, and 5R, and when the hydraulic pressure in the wheel cylinders 4L, 4R, 5L, and 5R is to be decreased, the pressure decrease control valves are opened so as to release the hydraulic pressure in the wheel cylinders 4L, 4R, 5L, and 5R to the hydraulic pressure control reservoir.

Moreover, when the hydraulic pressure supplied to the wheel cylinders 4L, 4R, 5L, and 5R is increased or pressurized in order to carry out the stabilization control (anti-skid control) or the like during the vehicle travel, the hydraulic pump is operated by the electric motor 12A while the supply control valve is opened, and the brake fluid discharged from the hydraulic pump is supplied to the wheel cylinders 4L, 4R, 5L, and 5R. On this occasion, the brake fluid in the reservoir 9 is supplied from the master cylinder 8 side to the suction side of the hydraulic pump.

A drive motor (M·G) 21 for applying travel driving forces and regenerative braking forces to the front wheels 2L and 2R is provided on a side of the front wheels 2L and 2R of the vehicle body 1. The travel drive motor 21 serving as an electric actuator is configured as an electric motor (motor generator) for vehicle drive for carrying out driving of causing the vehicle to travel during acceleration of the vehicle and the like, and generating (regenerating) electric power based on an inertia force of the vehicle during deceleration of the vehicle and the like.

In other words, the drive motor 21 has a function as a motor (electric motor) for generating a torque (rotational force) for causing the vehicle to travel based on, for example, electric power stored in a power storage device (not shown) of the vehicle, and a function as a generator (electric generator) for generating electric power based on a travel inertia force of the vehicle. In FIG. 1, only the drive motor 21 is illustrated as a drive source of the vehicle, but, for example, the drive motor 21 serves as the drive source for the travel in an electric vehicle, and the drive motor 21 and an engine (internal combustion engine) (not shown) serve as the drive source for the travel in a hybrid vehicle.

The drive motor 21 is controlled by the third ECU 22. The third ECU 22, similarly to the first and second ECUs 14 and 15, is constructed by a microcomputer, and serves as a drive motor control unit for controlling a drive state (power running and regeneration) of the drive motor 21. The third ECU 22 is configured to control the drive motor 21, thereby using the inertia force caused by the rotations of the respective wheels (front wheels 2L and 2R in FIG. 1) during the deceleration, the braking, and the like of the vehicle to acquire the braking force while recovering (regenerating) kinetic energy generated on this occasion as electric power.

On this occasion, the third ECU 22 is connected to the first ECU 14 and the second ECU 15 via the vehicle data bus 16, and constructs a regenerative braking control unit for controlling a regenerative braking amount. The regenerative braking control unit is configured to carry out control (regenerative cooperation control) of adjusting the braking force (regenerative braking force) generated by the regeneration of the drive motor 21 and a braking force (friction braking force) generated by the wheel cylinders 4L, 4R, 5L, and 5R during the deceleration, the braking, and the like.

In other words, the regenerative braking control unit carries out the brake control by subtracting the regenerative braking force from the brake operation by the driver to adjust the friction braking force so that a desired braking force is provided for the entire vehicle by both the braking forces. Specifically, the regenerative braking control unit carries out control of changing a control amount of the electric booster 10 (electric motor 10B) with respect to the operation amount of the brake pedal 6, thereby decreasing the hydraulic pressure in the master cylinder 8 by an amount corresponding to the regenerative braking force so that a sum of the braking force by the friction braking and the braking force by the regenerative braking is the desired braking force corresponding to the operation on the brake pedal 6.

The fourth ECU 23 serves as an automatic-brake braking command calculation part 32 (refer to FIG. 2) described later. In other words, the fourth ECU 23 serves as an automatic brake control unit for outputting a command (automatic-brake braking command value) for the automatic brake. The fourth ECU 23, similarly to the first, second, and third ECUs 14, 15, and 22, is constructed by a microcomputer, and is connected to the first, second, and third ECUs 14, 15, and 22 via the vehicle data bus 16.

On this occasion, the fourth ECU 23 is connected to an external world recognition sensor 24. The external world recognition sensor 24 constructs an object position measurement device for measuring a position of an object around the vehicle. For example, a camera (e.g., a digital camera) such as a stereo camera or a single camera, and/or a radar (e.g., a light emitting device such as a semiconductor laser, and a light reception device for receiving the light) such as a laser radar, an infrared radar, or a millimeter wave radar may be used as the external world recognition sensor 24. The external world recognition sensor 24 is not limited to the camera and the laser, and various sensors (a detection device, a measurement device, and an electric wave detector) or a communication device (e.g., vehicle-to-vehicle communication or ITS communication) capable of recognizing (detecting) a state of the external world around the vehicle may be used.

The fourth ECU 23 is configured to calculate, for example, the distance to a forward object based on a detection result (information) of the external world recognition sensor 24, and calculate the automatic-brake braking command value corresponding to a braking force to be applied based on this distance, a current travel speed of the vehicle, and the like. The calculated automatic-brake braking command value is output from the fourth ECU 23 to the vehicle data bus 16.

In this case, for example, when the first ECU 14 acquires the automatic-brake braking command value via the vehicle data bus 16, the first ECU 14 drives the electric motor 10B of the electric booster 10 based on this acquired automatic-brake braking command value. In other words, the first ECU 14 generates the hydraulic pressure inside the master cylinder 8 based on the automatic-brake braking command value and pressurizes the respective wheel cylinders 4L, 4R, 5L, and 5R, thereby applying braking forces (applying the automatic brake) to the wheels 2L, 2R, 3L, and 3R.

In this embodiment, the automatic-brake braking command value calculated by the fourth ECU 23 is acquired by the first ECU 14, and the first ECU 14 controls the electric booster 10, thereby applying the automatic brake. However, the configuration of this embodiment is not limited to this case, and there may be provided such a configuration that the automatic-brake braking command value calculated by the fourth ECU 23 is acquired by the second ECU 15, and the second ECU 15 controls the ESC 12, thereby applying the braking forces (applying the automatic brake) to the wheels 2L, 2R, 3L, and 3R. Moreover, there may be provided such a configuration that the automatic-brake braking command value calculated by the fourth ECU 23 is acquired by the third ECU 22, and the third ECU 22 controls the drive motor 21, thereby applying the braking forces (applying the automatic brake) to the wheels 2L and 2R.

Moreover, the fourth ECU 23 is configured to use information (e.g., the distance to an object) on the external world of the vehicle from the external world sensor 24 as main information to calculate the automatic-brake braking command value. However, the configuration is not limited to this case, and the automatic-brake braking command value may be calculated by using information (various state amounts of the vehicle) on vehicle behavior, for example, the operation amount (accelerator opening degree) of the accelerator pedal (not shown) operated by the driver, the deceleration of the vehicle, a yaw rate, a wheel speed, a steering angle, and the like as the main information.

In this case, when the accelerator opening degree is used, for example, when a one-pedal mode for using only the accelerator pedal to implement the acceleration, the deceleration, and the stop of the vehicle is selected, a decrease in the accelerator opening degree may be determined as a braking intention of the driver to calculate the automatic-brake braking command value inversely proportional to the accelerator opening degree. In this case, there may also be provided such a configuration that the braking intention of the driver is predicted based on a state in which the accelerator opening degree is 0, and an automatic brake command at such a degree as not to cause a braking force is calculated in order to increase a subsequent response upon the braking. Activation/deactivation of the one-pedal mode may be selected by, for example, the driver operating a shift lever (select lever) to a selection position for the one-pedal mode, or operating an activation/deactivation switch for the one-pedal mode.

When the deceleration is used, for example, a deceleration detected when the vehicle is stopped may be determined as a vehicle inclination together with a wheel speed to calculate an automatic-brake braking command value for holding the vehicle stop state. When the yaw rate is used, for example, when a yaw rate departing from a turn intention of the driver predicted based on a combination of the steering angle and the wheel speeds is detected, an automatic braking command to be distributed to the respective wheels 2L, 2R, 3L, and 3R may be calculated in order to cause the vehicle behavior to match the prediction.

In this case, for example, the braking force can be distributed to the respective wheels 2L, 2R, 3L, and 3R by driving the electric motor 10B of the electric booster 10, thereby generating the hydraulic pressure inside the master cylinder 8 and opening/closing necessary control valves out of the respective control valves of the ESC 12. Moreover, for example, the hydraulic pressure can be distributed to the respective wheels 2L, 2R, 3L, and 3R by driving the electric motor 12A of the ESC 12, thereby activating the hydraulic pumps and opening/closing necessary control valves.

Incidentally, when the brake pedal is operated by the driver during the automatic brake, such a configuration is conceivable as to add the automatic-brake braking command value and the braking command value corresponding to the brake pedal operation amount to each other, and apply a braking force corresponding to the sum of the braking command values. However, in the case of this configuration, when the brake pedal is operated by the driver during the automatic brake, the braking force (deceleration) rapidly increases, which may cause a sense of discomfort felt by the driver.

In contrast, as a configuration for suppressing such a rapid increase in the deceleration, for example, in Patent Literature 1, there is disclosed such a configuration that when a brake pedal is operated by the driver during the automatic brake, "a command value S1 acquired by delaying, by a predetermined period, a braking command value corresponding to a brake pedal operation amount" and "a command value S2 acquired by adding an automatic-brake braking command value to a product of the delayed command value S1 and a coefficient" are compared with each other, and a braking force corresponding to a larger one of the command values S1 and S2 is applied. However, in the case of this configuration, a brake pedal operation amount at which the braking command value corresponding to the brake pedal operation amount is selected (becomes effective) changes depending on the magnitude of the automatic-brake braking command value at that time.

Figure 13:
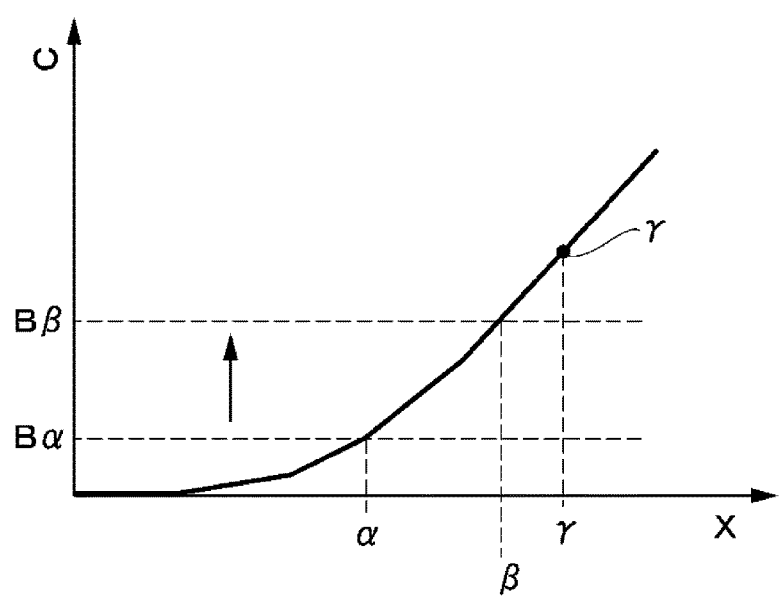
FIG. 13 is a characteristic chart for showing an example of a relationship between a brake pedal operation amount and a braking force according to a comparative example.

On this occasion, FIG. 13 is an illustration of such a configuration as to compare the automatic-brake braking command value and the braking command value corresponding to the brake pedal operation amount with each other, and select a larger one of the braking command values. In the case of this configuration, as shown in FIG. 13, for an automatic-brake braking command value Bα at which the braking command value for the automatic brake is small, the braking command value corresponding to the brake pedal operation amount at an operation amount α at which the brake pedal operation amount is small is selected (becomes effective). In other words, when the automatic-brake braking command value is Bα, an operation amount required until the braking force starts to increase after the operation on the brake pedal starts is the operation amount α.

In contrast, for the automatic-brake braking command values Bα and Bβ at which the braking command value for the automatic brake is large, the required operation amount until the braking force starts to increase is an operation amount β. In this case, when the driver feels that the braking force exerted during the automatic brake is insufficient and thus operates the brake pedal, an operation amount from which the braking force increases varies depending on the automatic-brake braking command values Bα and Bβ (the operation amount α and the operation amount at that time. As a result, the driver may feel a sense of discomfort.

Further, consideration is given to a case where the automatic-brake braking command value is increased, for example, in order to alleviate a collision when the braking command value corresponding to the brake pedal operation amount is selected. For example, consideration is given to a case in which the operation amount of the brake pedal is an operation amount γ, and the automatic-brake braking command value increases from the automatic-brake braking command value Bα. On this occasion, the automatic-brake braking command value needs to be more than the braking command value γ corresponding to the brake pedal operation amount on this occasion in order to apply a braking force more than the braking force corresponding to the operation on the brake pedal by the driver. In other words, the braking force does not increase until the automatic-brake braking command value becomes more than the braking command value γ corresponding to the brake pedal operation amount, and, for example, a braking distance until the vehicle stops may increase.

Figure 2:
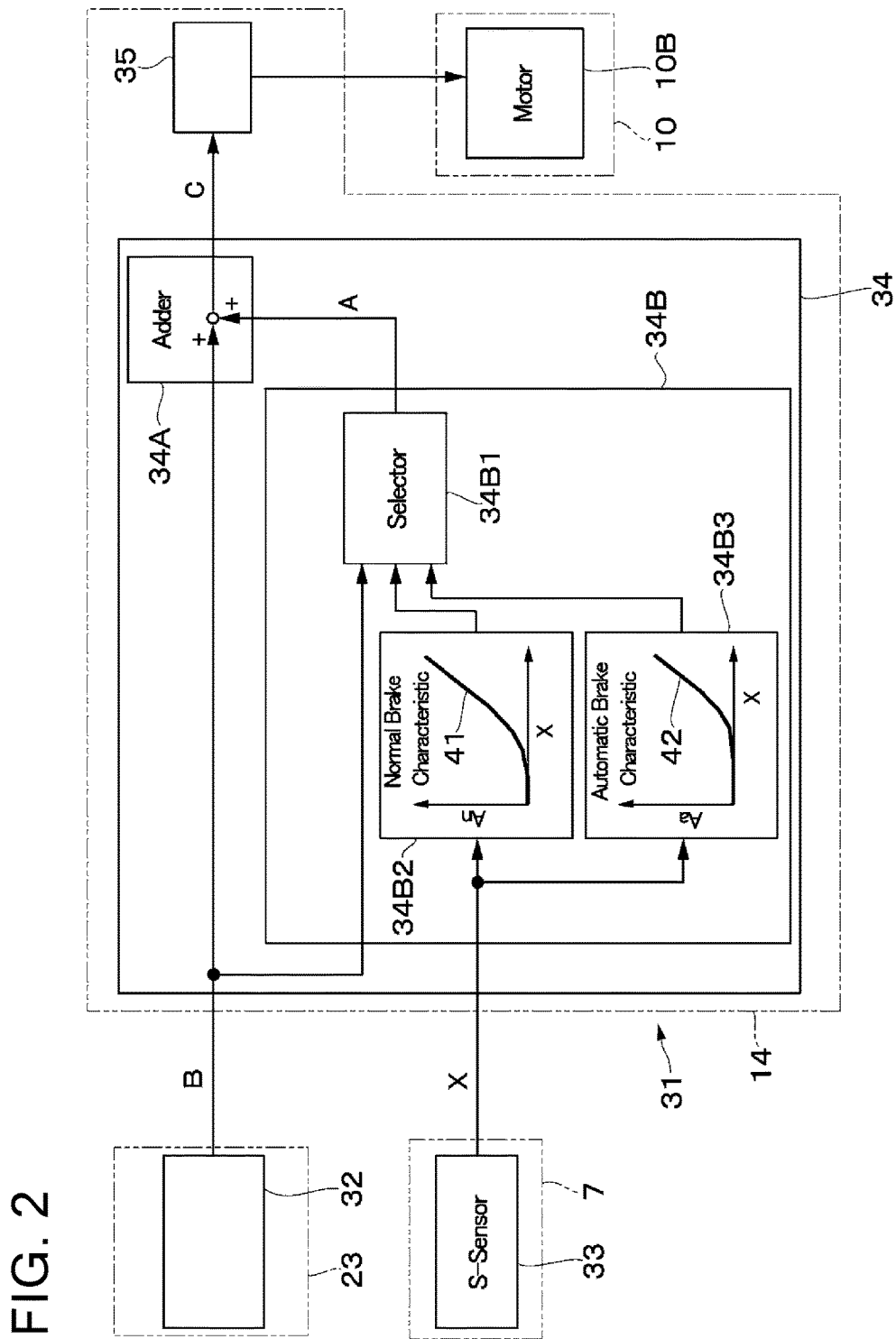
FIG. 2 is a block diagram for illustrating the brake control device according to the first embodiment.

In contrast, the following control is carried out in this embodiment. Specifically, when a stepping operation is carried out on the brake pedal 6 during the automatic brake, the characteristic of the braking command value corresponding to the brake pedal operation amount is switched from a normal brake characteristic to an automatic brake characteristic, thereby adding a braking command value in accordance with the automatic brake characteristic to the automatic-brake braking command value. Referring to FIG. 2, a description is given of this configuration.

In FIG. 2, a brake control device 31 is configured to control an electric actuator (e.g., electric booster 10) in accordance with the braking command value, thereby applying the braking forces to the wheels 2L, 2R, 3L, and 3R (applying brake hydraulic pressures serving as braking thrust forces to the wheel cylinders 4L, 4R, 5L, and 5R). The electric actuator controlled by the brake control device 31, namely, the electric actuator for applying the braking force to the vehicle is not limited to the electric booster 10, and various electric actuators capable of using electric control to adjust (increase/decrease) the braking forces on the wheels 2L, 2R, 3L, and 3R, for example, the ESC 12 and the drive motor 21, may be used.

The brake control device 31 includes an automatic brake control command calculation part 32 for calculating an automatic-brake braking command value B, a brake pedal operation amount detection part 33 for detecting the operation amount of the brake pedal 6 operated by the driver and outputting the operation amount as a pedal operation amount X, a braking command calculation part 34 for calculating a braking command value C based on the automatic-brake braking command value B and the pedal operation amount X, and a braking force control part 35 for controlling the braking force of the vehicle based on the braking command value C.

In this case, for example, the automatic-brake braking command calculation part 32 corresponds to the fourth ECU 23, the brake pedal operation amount detection part 33 corresponds to the operation amount detector 7, and the braking command calculation part 34 and the braking force control part 35 correspond to the first ECU 14. However, the configuration is not limited to this case. For example, whether or not to implement the function of each of the parts 32, 33, 34, and 35 in respective control units, for example, assigning the function of the automatic-brake braking command calculation part 32 to the first ECU 14 may be appropriately changed depending on a vehicle in which the brake control device 31 is installed.

The automatic-brake braking command calculation part 32 is configured to calculate the automatic-brake braking command value corresponding to a braking force to be applied as the automatic brake based on the external world information acquired by the external world recognition sensor 24, for example, a camera or a laser, and/or the vehicle behavior information, for example, the accelerator opening degree, the deceleration, and the wheels speeds. The calculation of the automatic-brake braking command value is not limited to this case, and various calculation methods for the automatic-brake braking command value including publicly known technologies may be used. The automatic-brake braking command calculation part 32 outputs the calculated automatic-brake braking command value B to the control command calculation part 34 (more specifically, a braking command calculation part 34A and a pedal operation braking command selection part 34B1 of a pedal operation braking command calculation part 34B).

The brake pedal operation amount detection part 33 is configured to detect, for example, a pedal stroke amount, which is a displacement amount (stroke amount) of the brake pedal 6, as the pedal operation amount (brake operation amount). The pedal operation amount is not limited to the pedal stroke, and a stepping force (pedal stepping force) of the brake pedal 6 or a rotation amount (rotation angle) of the brake pedal 6 may be detected as the pedal operation amount. Moreover, the detection of the pedal operation amount is not limited to the configuration of directly detecting the operation amount of the brake pedal 6, and the pedal operation amount may be indirectly detected by, for example, detecting displacement of a member correlating with the operation amount of the brake pedal 6 and the like. The pedal operation amount X detected by the brake pedal operation amount detection part 33 is output to the braking command calculation part 34 (more specifically, a normal brake characteristic part 34B2 and an automatic brake characteristic part 34B3 of the pedal operation braking command calculation part 34B).

The braking force control part 35 is configured to input the braking command value C from the braking command calculation part 34 (more specifically, a braking command addition part 34A). The braking force control part 35 outputs a drive command to, for example, the electric booster 10 serving as the electric actuator based on the braking command value C calculated by the braking command calculation part 34. In other words, the braking force control part 35 outputs a drive command (drive current) to (the electric motor 10B of) the electric booster 10 so as to control (adjust) the brake pressure generated in the master cylinder 8, thereby applying the braking forces to the wheels 2L, 2R, 3L, and 3R. The method of using the braking force control part 35 to control the braking force is not limited to the control of the brake pressure (master cylinder pressure) by the electric booster 10, and various control methods for the braking force including publicly known technologies, for example, a method of controlling a regenerative torque of the drive motor 21 and a method of controlling the brake pressure (wheel cylinder pressure) by the ESC 12, may be used.

Further, when the braking force is applied by using a plurality of electric actuators (e.g., the electric booster 10, the ESC 12, and the drive motor 21), the braking force control part 35 distributes braking forces applied by the respective electric actuators so that the respective electric actuators cooperate with one another to apply the braking forces. In this case, the braking force control part 35 outputs drive commands corresponding to the distributed braking forces to the respective electric actuators.

A description is now given of the braking command calculation part 34 for calculating the braking command value.

The braking command calculation part 34 includes the braking command addition part 34A and the pedal operation braking command calculation part 34B. The braking command addition part 34A is configured to add the automatic-brake braking command value B calculated by the automatic-brake braking command calculation part 32 and a pedal operation braking command value A calculated by the pedal operation braking command calculation part 34B to each other, and output the braking command value C, which is the sum of the addition, to the braking force control part 35.

The pedal operation braking command calculation part 34B includes the pedal operation braking command selection part 34B1, the normal brake characteristic part 34B2, and the automatic brake characteristic part 34B3. The pedal operation braking command selection part 34B1 is configured to input the automatic-brake braking command value B output from the automatic-brake braking command calculation part 32, a braking command value An output from the normal brake characteristic part 34B2, and a braking command value Aa output from the automatic brake characteristic part 34B3. The pedal operation braking command selection part 34B1 selects the braking command value An output from the normal brake characteristic part 34B2 when the automatic-brake braking command value is 0 (without the automatic brake), and selects the braking command value Aa output from the automatic brake characteristic part 34B3 when the automatic-brake braking command value is more than 0 (with the automatic brake), to thereby output the selection result as the pedal operation braking command value A.

Thus, when the automatic-brake braking command value is 0, the braking command value An output from the normal brake characteristic part 34B2 is directly output from the braking command calculation part 34 to the braking force control part 35 as the braking command value C. In contrast, when the automatic-brake braking command value is more than 0, a result acquired by adding the automatic-brake braking command value B to the braking command value Aa output from the automatic brake characteristic part 34B3 is output from the braking command calculation part 34 to the braking force control part 35 as the braking command value C.

The normal brake characteristic part 34B2 is configured to input the pedal operation amount X output from the brake pedal operation amount detection part 33. The normal brake characteristic part 34B2 calculates the braking command value An corresponding to the current pedal operation amount X based on the normal brake characteristic represented as a characteristic curve 41 in FIG. 2, and outputs the calculated braking command value An to the pedal operation braking command selection part 34B1. The normal brake characteristic (characteristic curve 41) is a characteristic of the braking command value An corresponding to the pedal operation amount X, and, as illustrated in FIG. 2, generally has such a characteristic as to monotonically increase with respect to the pedal operation amount. A method of setting the normal brake characteristic is known to a person skilled in the art, and a detailed description thereof is therefore omitted herein.

The normal brake characteristic part 34B3 is configured to input the pedal operation amount X output from the brake pedal operation amount detection part 33. The automatic brake characteristic part 34B3 calculates the braking command value Aa corresponding to the current pedal operation amount X based on the automatic brake characteristic represented as a characteristic curve 42 in FIG. 2, and outputs the calculated braking command value Aa to the pedal operation braking command selection part 34B1. In this way, according to this embodiment, the pedal operation braking command calculation part 34B includes the normal brake characteristic and the automatic brake characteristic as characteristics of the braking command value corresponding to the operation amount X of the brake pedal 6.

Figure 3:
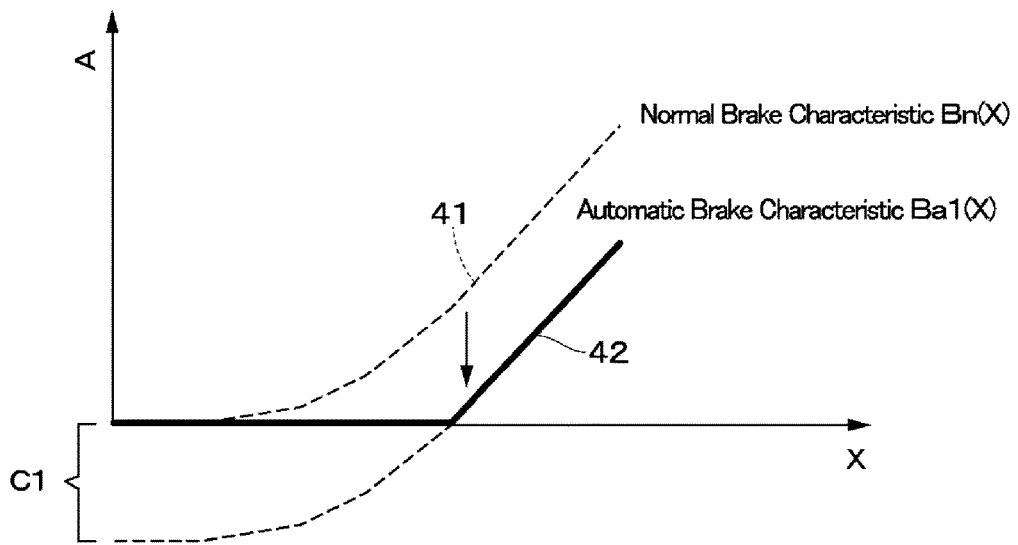
FIG. 3 is a characteristic chart for showing a normal brake characteristic and an automatic brake characteristic according to the first embodiment.

Referring to FIG. 3, a description is now given of a method of setting the automatic brake characteristic (characteristic curve 42) according to the first embodiment. The characteristic curve 42 represented as the thick sold line in FIG. 3 indicates the automatic brake characteristic according to the first embodiment. On this occasion, the characteristic curve 41 represented as the broken line in FIG. 3 is the normal brake characteristic, and the normal brake characteristic is represented as a function Bn(X) of the pedal operation amount X. In this case, the automatic brake characteristic (characteristic curve 42) according to the first embodiment is calculated in accordance with Expression 1 similarly represented as a function Ba1(x) of the pedal operation amount X.

$$Ba1(X)=Bn(X)-C1 \text{ and } Ba1(X) \geq 0 \quad \text{[Expression 1]}$$

In this way, according to the first embodiment, the automatic brake characteristic Ba1(X) is such a characteristic that the braking command value A with respect to the operation amount is less than that of the normal brake characteristic Bn(X). More specifically, the automatic brake characteristic Ba1(X) is set so as to be a value acquired by subtracting a predetermined amount (C1) from the braking command value corresponding to the brake pedal operation amount based on the normal brake characteristic Bn(X), and to be equal to or more than 0.

On this occasion, C1, which is the predetermined value, may be an arbitrary value. For example, C1 may be set to the most frequent value as the automatic-brake braking command value. In other words, the automatic brake characteristic Ba1(X) can be set to be small so that the result of the addition of the most frequent automatic-brake braking command value C1 to the automatic brake characteristic Ba1(X) is similar to the normal brake characteristic Bn(X). According to this embodiment, the characteristic of the braking command value corresponding to the pedal operation amount is represented as a function, but the representation method of the characteristic is not limited to a function, and may be, for example, an array used in a program, or map data representing the relationship between the pedal operation amount and the braking command value.

In any case, according to this embodiment, when the stepping operation is applied to the brake pedal 6 during the automatic brake, the braking command calculation part 34 adds, instead of the normal brake characteristic Bn(X) represented as the characteristic curve 41, the braking command value Aa based on the automatic brake characteristic Ba1(X) represented as the characteristic curve 42 to the automatic-brake braking command value B, and outputs the addition result to the braking force control part 35 as the braking command value C. The braking force control part 35 controls the electric actuator (e.g., the electric booster 10) so as to output the braking force (braking thrust force) accompanying the operation on the brake pedal 6 in accordance with the addition result (braking command value).

The brake control device according to this embodiment has the above-mentioned configuration. A description is now given of the operation thereof.

First, a description is given of a case in which the automatic-brake braking command value is 0 (without the automatic brake). In this case, when the driver of the vehicle carries out the stepping operation on the brake pedal 6 in a direction indicated by an arrow Y, the pedal operation amount is input from the brake pedal operation amount detection part 33 (operation amount detector 7) to the braking command calculation part 34 (first ECU 14). The braking command calculation part 34 outputs the braking command value C corresponding to the current pedal operation amount X based on the normal brake characteristic (characteristic curve 41) to the braking force control part 35. The braking force control part 35 drives the electric motor 10B of the electric booster 10 based on the braking command value C input from the braking command calculation part 34, thereby increasing the pressure in the master cylinder 8.

On the other hand, when the automatic-brake braking command value B is more than 0 (with the automatic brake), the automatic-brake braking command value B corresponding to the braking force to be currently applied is input from the automatic-brake braking command calculation part 32 (fourth ECU 32) to the braking command calculation part 34 (first ECU 14). On this occasion, when the brake pedal 6 is not operated by the driver, the braking command calculation part 34 directly outputs the automatic-brake braking command value to the braking force control part 35 as the braking command value C. The braking force control part 35 drives the electric motor 10B of the electric booster 10 based on the braking command value C, thereby applying the braking force.

On the other hand, when the stepping operation is applied to the brake pedal 6 during the automatic brake, the braking command calculation part 34 adds the braking command value Aa based on the automatic brake characteristic Ba1(X), namely, the braking command value Aa corresponding to the pedal operation amount X based on the characteristic curve 42 of FIG. 3, to the current automatic-brake braking command value B, and outputs the addition result to the braking force control part 35. The braking force control part 35 drives the electric motor 10B of the electric booster 10 based on the braking command value C acquired by the addition.

Figure 4:
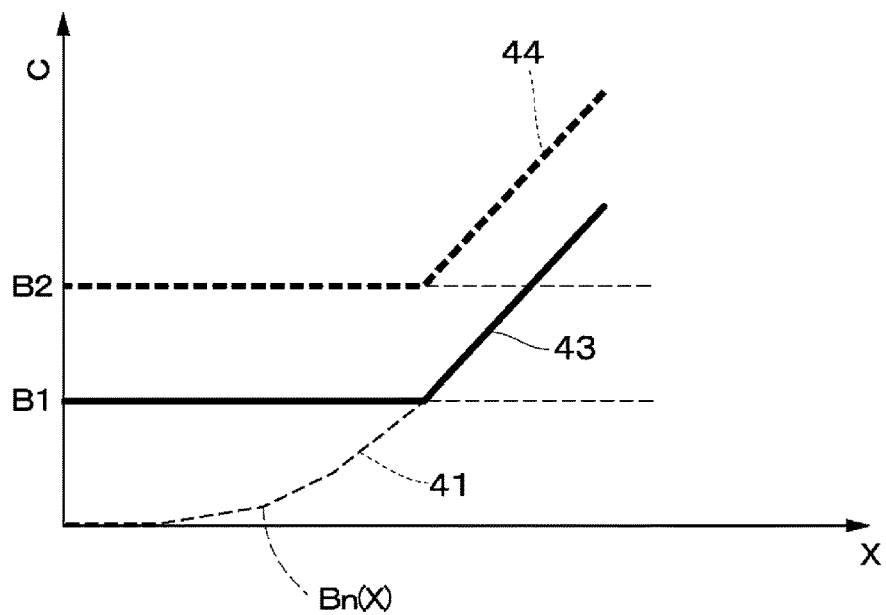
FIG. 4 is a characteristic chart for showing a result of addition of the automatic brake characteristic and an automatic-brake braking command value.

FIG. 4 is an illustration of a characteristic of the braking command value C with respect to the brake pedal operation amount X when the driver operates the brake pedal during the automatic brake. The automatic brake characteristic uses the characteristic of FIG. 3, namely, the function Ba1(X) represented as the characteristic curve 42.

First, when the automatic-brake braking command value is 0, the braking command value C based on the normal brake characteristic Bn(X) is output from the braking command calculation part 34. In contrast, when the automatic-brake braking command value B1 is output from the automatic-brake braking command calculation part 32, the braking command value C is output from the braking command calculation part 34 based on a characteristic curve 43 represented by a solid line, which is an addition result of the braking command value Aa based on the automatic brake characteristic Ba1(X) and the automatic-brake braking command value B1. On this occasion, when the automatic-brake braking command value B1 is the same value as the predetermined value C1 (B1=C1), the braking command value C, which is the addition result (characteristic curve 43), is the same braking command value as the normal brake characteristic Bn(X) in a range where the braking command value C is more than the automatic-brake braking command value B1.

Figure 5:
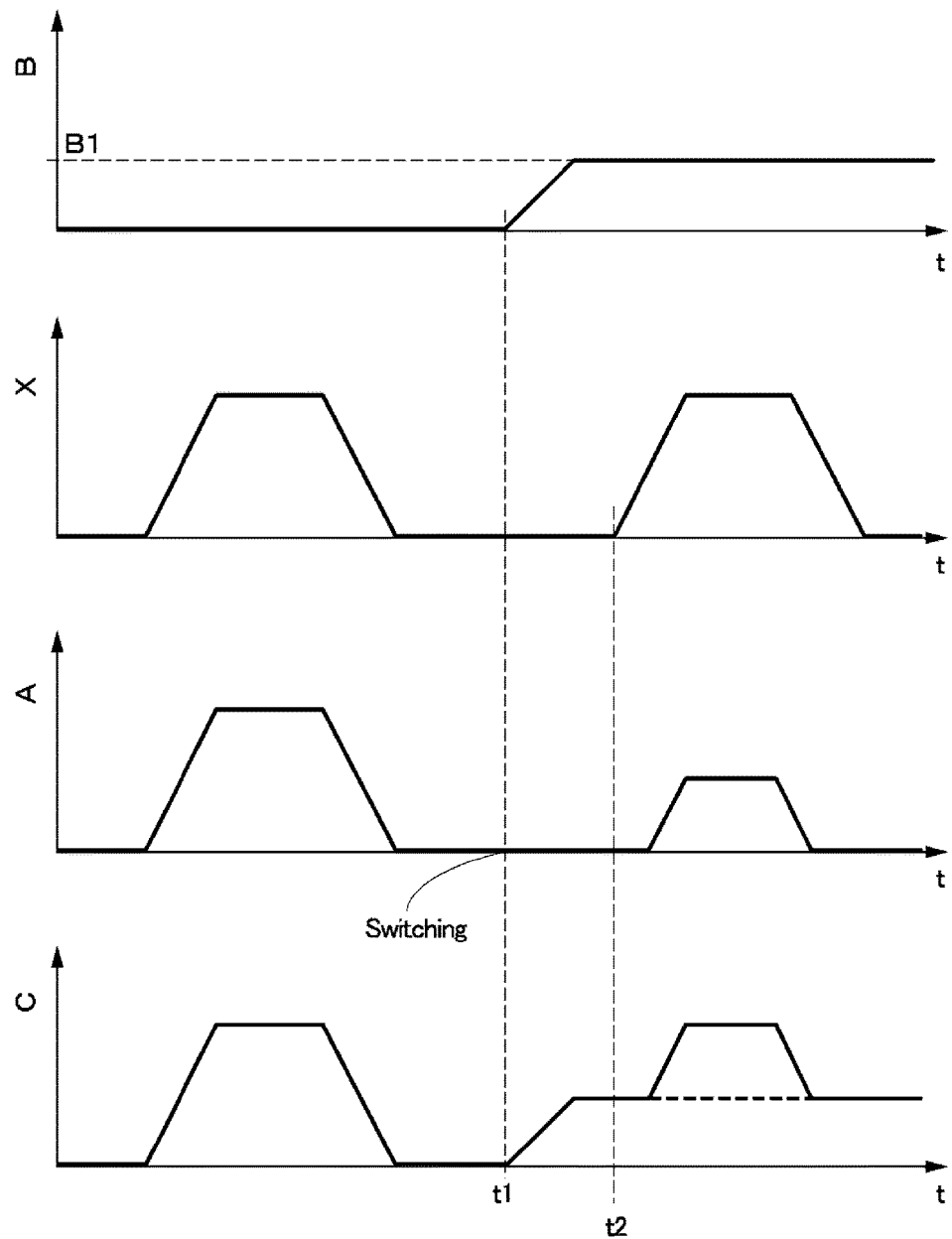
FIG. 5 is a characteristic chart for showing an example of temporal changes in the automatic-brake braking command value, a pedal operation amount, a pedal operation braking command value, and a braking command value.

FIG. 5 is an illustration of temporal changes in the automatic-brake braking command value B, the pedal operation amount X, the pedal operation braking command value A, and the braking command value C. In FIG. 5, when the brake pedal 6 is operated while the automatic-brake braking command value B is 0, the pedal operation braking command value A corresponding to the pedal operation amount X is calculated based on the normal brake characteristic Bn(X), and the pedal operation braking command value A is used as it is at the braking command value C. Then, when the operation on the brake pedal 6 is released, the automatic-brake braking command value B is output at a time t1, and the automatic-brake braking command value increases to B1, the braking command value C also increases.

When the brake pedal 6 is operated at a time t2 under this state, the pedal operation braking command value A corresponding to the pedal operation amount X is calculated based on the automatic brake characteristic Ba1(X), and the addition result of the pedal operation braking command value A and the automatic-brake braking command value B1 becomes the braking command value C. As a result, even when the brake pedal 6 is operated during the automatic brake, a sudden increase in the braking force (deceleration) can be suppressed, and a sense of discomfort felt by the driver can be suppressed. Moreover, the deceleration is similar to that of the characteristic of the normal brake during the braking based on the frequent automatic-brake braking command value B, and thus operability by the driver can be increased.

Figure 6:
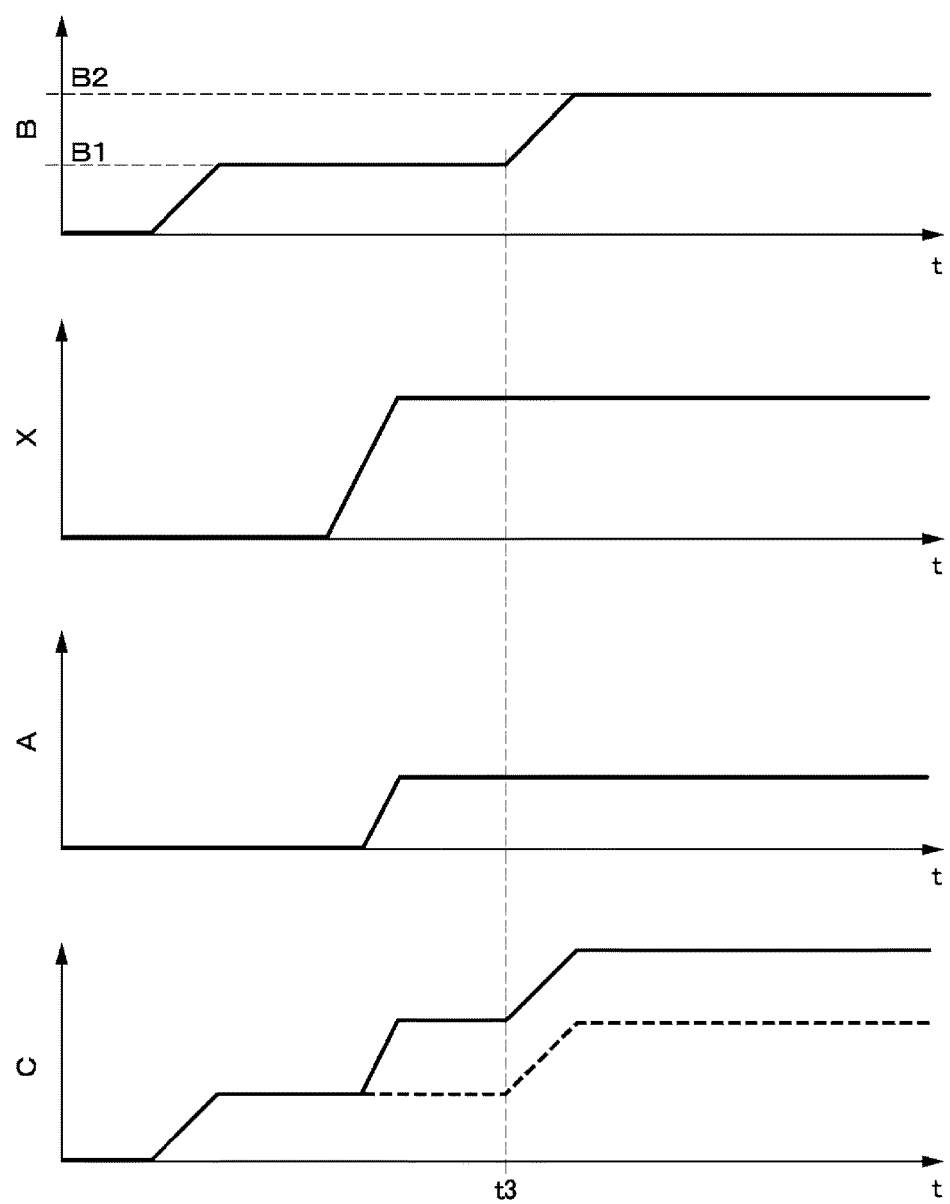
FIG. 6 is a characteristic chart for showing another example of the temporal changes in the automatic-brake braking command value, the pedal operation amount, the pedal operation braking command value, and the braking command value.

FIG. 6 is an illustration of a case where the automatic-brake braking command value changes from B1 to B2 at a time t3 while the brake pedal 6 is operated at the automatic-brake braking command value B1 (for example, the automatic-brake braking command value B2 is input for collision avoidance at the time t3 while the automatic-brake braking command value B1 in the one-pedal mode is input). In this case, in other words, when the automatic-brake braking command value B1 is output from the automatic-brake braking command calculation part 32, the addition result of the automatic brake characteristic Ba1(X) represented as the characteristic curve 44 of the thick broken line of FIG. 4 and the automatic-brake braking command value B2 is output from the braking command calculation part 34 as the braking command value C. Therefore, as shown in FIG. 6, the increase in the automatic-brake braking command value can be reflected as the increase in the deceleration of the vehicle independently of the pedal operation amount.

Thus, according to this embodiment, when the stepping operation is carried out on the brake pedal 6 during the automatic brake, the characteristic of the braking command value A corresponding to the pedal operation amount X is switched from the normal brake characteristic Bn(X) to the automatic brake characteristic Ba1(X), and the braking command value A based on the automatic brake characteristic Ba1(X) is added to the automatic-brake braking command value B. In this case, the automatic brake characteristic Ba1(X) is such a characteristic that the braking command value A with respect to the pedal operation amount X is less than that of the normal brake characteristic Bn(X). Therefore, a sudden increase in the braking force (deceleration) can be suppressed compared with a case where the braking command value A (braking command value An based on the normal brake characteristic) corresponding to the pedal operation amount X is added as it is to the automatic-brake braking command value B. As a result, a sense of discomfort felt by the driver can be suppressed.

Moreover, the braking command value Aa based on the automatic brake characteristic is added to the automatic-brake braking command value B, and the operation amount at which the deceleration starts to increase due to the brake pedal operation can be made constant independently of the magnitude of the automatic-brake braking command value B. Therefore, also in this respect, a sense of discomfort felt by the driver can be decreased. Further, the change in the automatic-brake braking command value B is reflected as it is in the addition result. Therefore, for example, an increase in the automatic-brake braking command value B for the collision avoidance can be reflected in an increase in the deceleration without delay independently of the pedal operation amount X. As a result, for example, the braking distance can be decreased.

According to this embodiment, the automatic brake characteristic Ba1(X) is set to be small so that the result of the addition of the most frequent automatic-brake braking command value C1 to the automatic brake characteristic Ba1(X) is similar to the normal brake characteristic Bn(X). Therefore, a characteristic of the braking command value (addition result) corresponding to the pedal operation amount during the automatic brake becomes the braking force characteristic of the normal brake characteristic, and a sense of discomfort during the brake pedal operation can be alleviated.

In this embodiment, the automatic brake characteristic Ba1(X) is set so as to be a value acquired by subtracting the predetermined amount (C1) from the braking command value corresponding to the brake pedal operation amount based on the normal brake characteristic Bn(X), and to be equal to or more than 0. Therefore, the automatic brake characteristic can be simply set.

Figure 7:
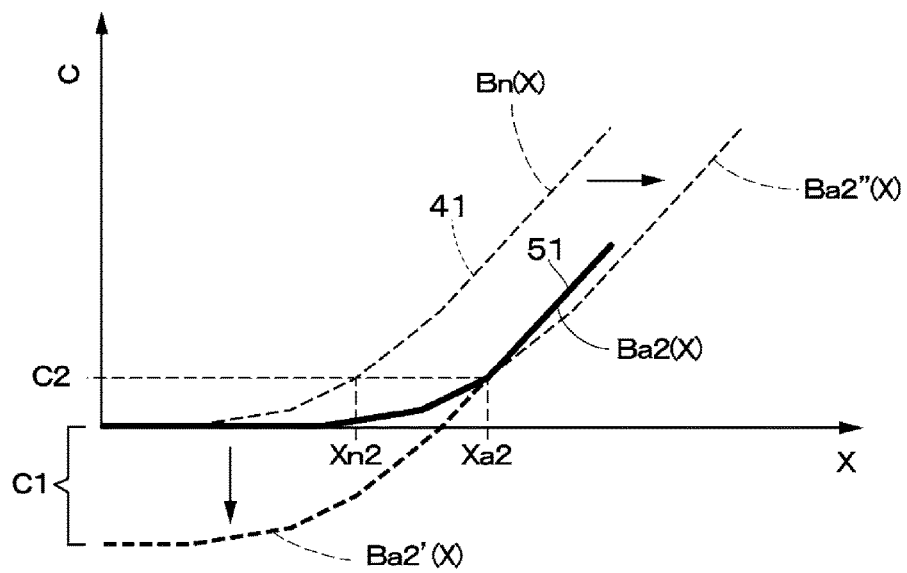
FIG. 7 is a characteristic chart for showing the normal brake characteristic and the automatic brake characteristic according to a second embodiment of the present invention.

Next, FIG. 7 is an illustration of a second embodiment of the present invention. A feature of the second embodiment is that, in a region in which the braking command value Aa based on the automatic brake characteristic is equal to or less than a predetermined value, the automatic brake characteristic is set so as to be the same as the characteristic in the region in which the braking command value An based on the normal brake characteristic is equal to or less than the predetermined value. In the second embodiment, like components of the first embodiment are denoted by like reference numerals, and a description thereof is omitted.

The automatic brake characteristic (characteristic curve 51) shown in FIG. 7 is used in the second embodiment in place of the automatic brake characteristic (characteristic curve 42) according to the first embodiment. Referring to FIG. 7, a description is now given of a method of setting the automatic brake characteristic (characteristic curve 51) according to the second embodiment.

The characteristic curve 51 of FIG. 7 is the automatic brake characteristic according to the second embodiment represented as a function Ba2(X) of the pedal operation amount X. On this occasion, in order to acquire Ba2(X), similarly to the automatic brake characteristic Ba1(X) according to the first embodiment, first, Ba2'(X) is acquired by subtracting an arbitrary braking command value C1 from the normal brake characteristic Bn(X). In other words, Ba2'(X) is represented as Expression 2.

$$Ba2'(X)=Bn(X)-C1 \quad \text{[Expression 2]}$$

Then, in the normal brake characteristic Bn(X) and Ba2'(X), pedal operation amounts Xn2 and Xa2 corresponding to a braking command value C2 are acquired, and a characteristic Ba2"(X) is acquired by displacing the normal brake characteristic Bn(X) in the pedal operation amount axis direction (toward a positive direction) by a difference between Xn2 and Xa2. In other words, Ba2"(X) is represented as Expression 3.

$$Ba2"(X)=Bn(X-(Xa2-Xn2)) \quad \text{[Expression 3]}$$

Then, the automatic brake characteristic Ba2(X) is set to such a characteristic that Ba2"(X) is selected when the pedal operation amount is less than Xa2, and Ba2'(X) is selected when the pedal operation amount is equal to or more than Xa2. In other words, Ba2(X) is represented as Expression 4.

$$Ba2(X)=Ba"(X) \text{ (when } X<Xa2\text{), and}$$

$$Ba2'(X) \text{ (when } X≤Xa2\text{)} \quad \text{[Expression 4]}$$

In this way, according to the second embodiment, in the region in which the braking command value based on the automatic brake characteristic Ba2(X) is equal to or less than the predetermined value C2, the automatic brake characteristic Ba2(X) is set so as to be the same as the characteristic in the region in which the braking command value based on the normal brake characteristic Bn(X) is equal to or less than the predetermined value C2. In this case, the braking command value C2, which is the predetermined value, may be an arbitrary value. For example, C2 is an adjustable value set depending on the vehicle, and is acquired in advance by experiments or simulation so as to be a value that can suppress a sense of discomfort felt by the driver. Moreover, also according to the second embodiment, the characteristic of the braking command value corresponding to the pedal operation amount is represented as a function, but the representation method for the characteristic is not limited to a function. The characteristic may also be expressed as, for example, an array used in a program, or map data representing the relationship between the pedal operation amount and the braking command value.

The second embodiment uses the automatic brake characteristic Ba2(X) as described above, and a basic action is not particularly different from that of the first embodiment. In other words, the second embodiment can suppress a sense of discomfort felt by the driver similarly to the first embodiment.

Figure 8:
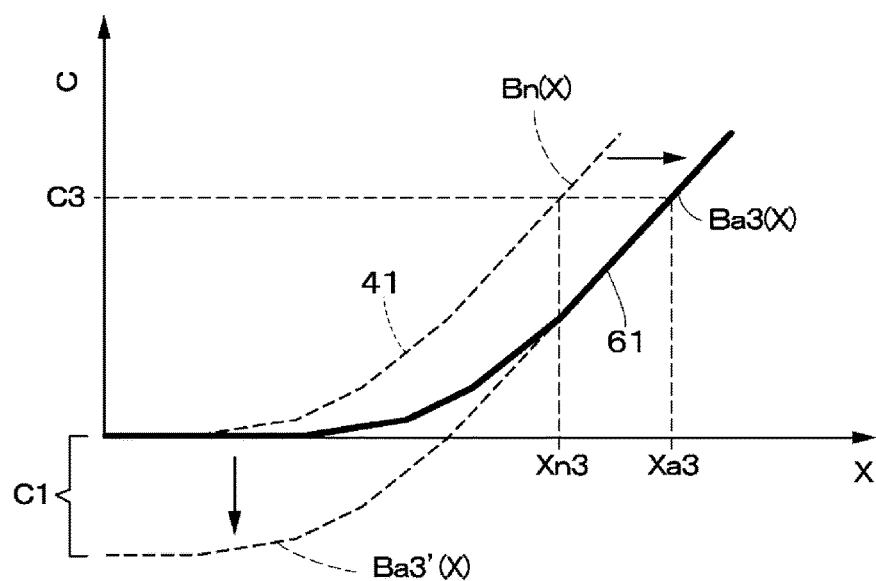
FIG. 8 is a characteristic chart for showing the normal brake characteristic and the automatic brake characteristic according to a third embodiment of the present invention.

FIG. 8 is an illustration of a third embodiment of the present invention. A feature of the third embodiment is that the braking command value is set to a braking command value corresponding to the brake pedal operation amount acquired by increasing an operation amount at which the braking command value corresponding to the brake pedal operation amount based on the normal brake characteristic is more than 0 by a predetermined operation amount, thereby setting the automatic brake characteristic so as to be less than the normal brake characteristic. In the third embodiment, like components of the first embodiment are denoted by like reference numerals, and a description thereof is omitted.

The automatic brake characteristic (characteristic curve 61) shown in FIG. 8 is used in the third embodiment in place of the automatic brake characteristic (characteristic curve 42) according to the first embodiment. Referring to FIG. 8, a description is now given of a method of setting the automatic brake characteristic (characteristic curve 61) according to the third embodiment.

The characteristic curve 61 of FIG. 8 is the automatic brake characteristic according to the third embodiment represented as a function Ba3(X) of the pedal operation amount X. On this occasion, in order to acquire Ba3(X), similarly to the automatic brake characteristic Ba1(X) according to the first embodiment, first, Ba3'(X) is acquired by subtracting an arbitrary braking command value C1 from the normal brake characteristic Bn(X). In other words, Ba3'(X) is represented as Expression 5.

$$Ba3'(X)=Bn(X)-C1 \quad \text{[Expression 5]}$$

Then, in the normal brake characteristic Bn(X) and Ba3'(X), pedal operation amounts Xn3 and Xa3 corresponding to a braking command value C3 are acquired, to thereby acquire the characteristic Ba3 (X) by displacing the normal brake characteristic Bn(X) in the pedal operation amount axis direction (toward a positive direction) by a difference between Xn3 and Xa3. In other words, Ba3(X) is represented as Expression 6.

$$Ba3(X)=Bn(X-(Xa3-Xn3)) \quad \text{[Expression 6]}$$

In this way, according to the third embodiment, the braking command value is set to the braking command value corresponding to the brake pedal operation amount acquired by increasing the operation amount at which the braking command value corresponding to the brake pedal operation amount based on the normal brake characteristic Bn(X) is more than 0 by the predetermined operation amount (difference between Xn3 and Xa3), thereby setting the automatic brake characteristic Ba3(X) so as to be less than the normal brake characteristic. As a result, when the automatic-brake braking command value is the same value as C1, and the pedal operation amount becomes Xn3, the addition result of the automatic brake characteristic Ba3(Xn3) and the automatic-brake braking command value C1 is the normal brake characteristic Bn(Xn3).

According to the third embodiment, the reference point for calculating the amount of shifting Bn(X) in the pedal operation amount axis direction so that the braking command value after the addition is close to the normal brake characteristic Bn(X) is only the braking command value C1, but the reference point may be, for example, the pedal operation amount to set the shift amount. Moreover, the reference point may be a plurality of reference points, or the reference point may be set to a certain range, and the shift amount may be calculated in the range so that the difference between the normal brake characteristic Bn(X) and the addition result of the automatic-brake braking command value C1 and the automatic brake characteristic Ba3(X) decreases. Moreover, also according to the third embodiment, the characteristic of the braking command value corresponding to the pedal operation amount is represented as a function, but the representation method for the characteristic is not limited to a function. The characteristic may also be expressed as, for example, an array used in a program, or map data representing the relationship between the pedal operation amount and the braking command value.

The third embodiment uses the automatic brake characteristic Ba3(X) as described above, and a basic action is not particularly different from that of the first embodiment. In other words, the third embodiment can suppress a sense of discomfort felt by the driver similarly to the first embodiment.

Figure 9:
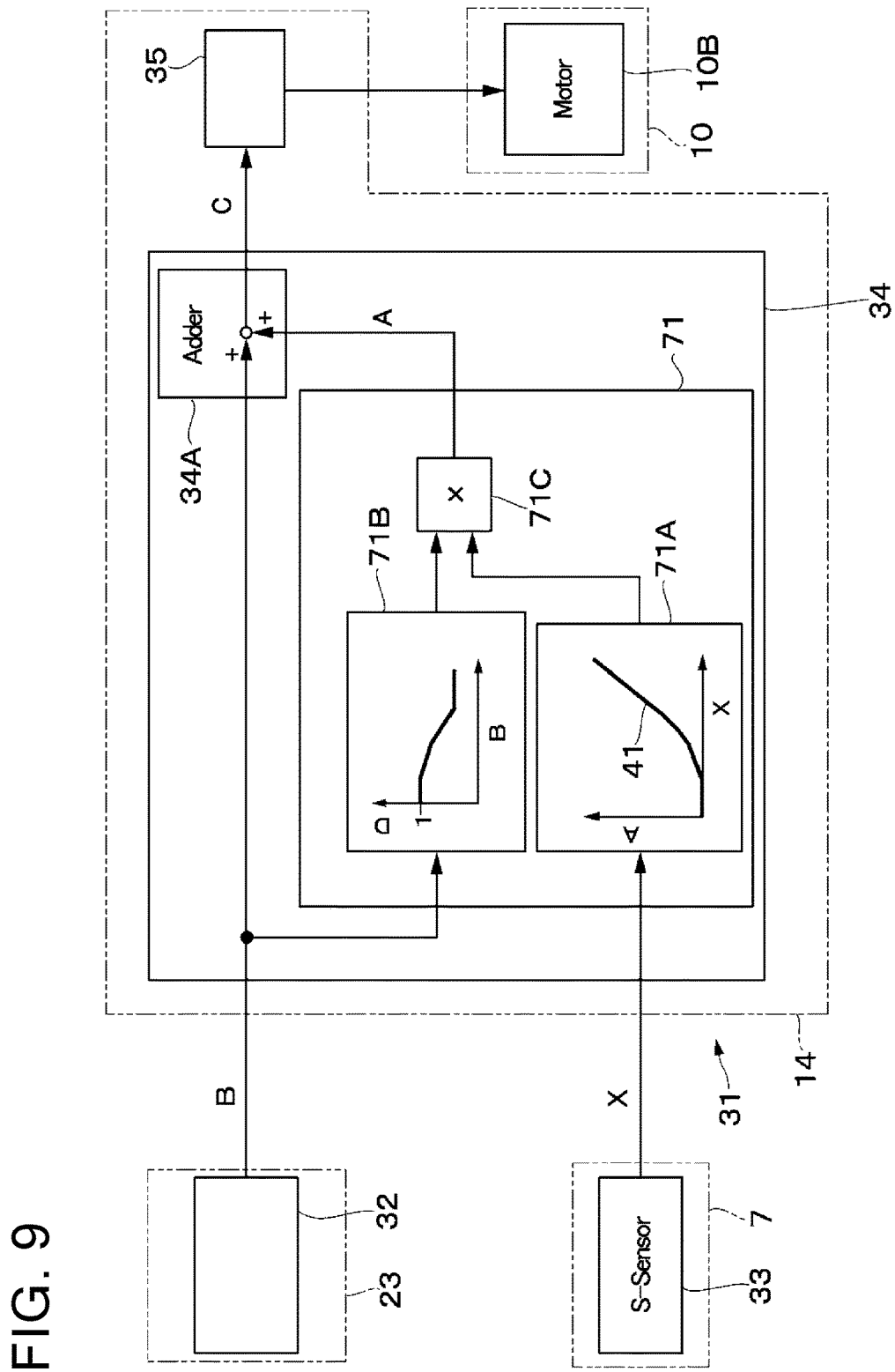
FIG. 9 is a block diagram for illustrating a brake control device according to a fourth embodiment of the present invention.
Figure 10:
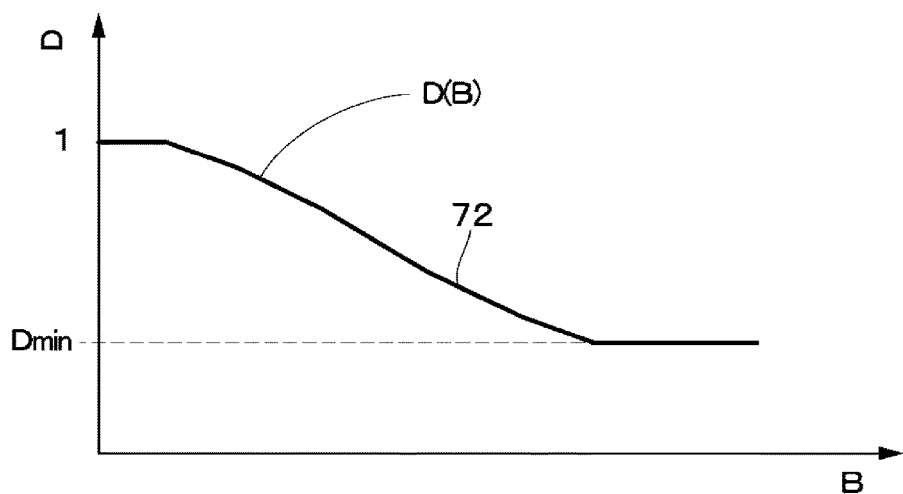
FIG. 10 is a characteristic chart for showing an example of a relationship between a coefficient by which the normal brake characteristic is to be multiplied and the automatic-brake braking command value.
Figure 11:
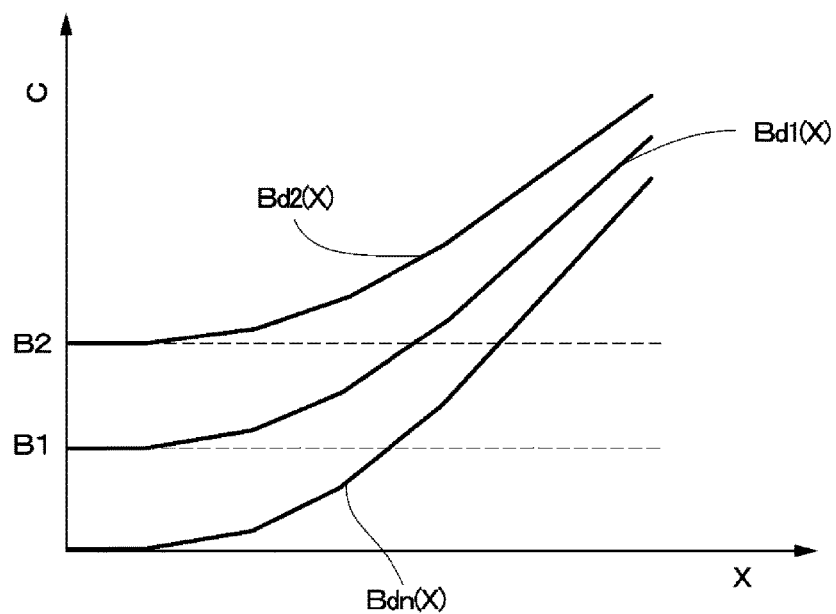
FIG. 11 is a characteristic chart for showing a result of addition of the normal brake characteristic multiplied by the coefficient and the automatic-brake braking command value.

Next FIG. 9 to FIG. 11 are illustrations of a fourth embodiment of the present invention. A feature of the fourth embodiment is that the automatic brake characteristic is set so as to be less than the normal brake characteristic by multiplying the normal brake characteristic by a coefficient equal to or less than 1. In the fourth embodiment, like components of the first embodiment are denoted by like reference numerals, and a description thereof is omitted.

In FIG. 8, a pedal operation braking command calculation part 71 is used in the fourth embodiment in place of the pedal operation braking command calculation part 34B of the first embodiment. The pedal operation braking command calculation part 71 includes a normal brake characteristic part 71A, a coefficient characteristic part 71B, and a multiplication part (operator) 71C.

The normal brake characteristic part 71A is the same as the normal brake characteristic part 34B2 of the first embodiment, and is configured to input the pedal operation amount X from the brake pedal operation amount detection part 33. The coefficient characteristic part 71B is configured to input the automatic-brake braking command value B from the automatic-brake braking command calculation part 32. The coefficient characteristic part 71B is configured to input the automatic-brake braking command value B, and output a coefficient D for multiplying the braking command value An output from the normal brake characteristic part 71A. The multiplication part 71C is configured to multiply the braking command value An output from the normal brake characteristic part 71A by the coefficient D output from the coefficient characteristic part 71B, and output a result of the multiplication to the braking command addition part 34A as the pedal operation braking command value A.

Referring to FIG. 10, a description is now given of a coefficient characteristic of the coefficient characteristic part 71B. A characteristic curve 72 of FIG. 10 represents the characteristic of the coefficient by which the braking command value is to be multiplied as a function D(B) of the automatic-brake braking command value B. According to this embodiment, the coefficient characteristic is represented as a function, but the representation method for the characteristic is not limited to a function. The coefficient characteristic may also be represented as, for example, an array used in a program or map data representing the relationship between the pedal operation amount and the braking command value.

The coefficient characteristic D(B) is set so as to be 1 when the automatic-brake braking command value B is 0, and to decrease as the automatic-brake braking command value B increases. The method of setting the coefficient characteristic D(B) may be arbitrary. For example, when the coefficient characteristic D(B) is set such that a result of an addition of the normal brake characteristic multiplied by the coefficient D(B) to an arbitrary automatic-brake braking command value B is equal to or more than a normal brake characteristic Bn(X4) corresponding to a certain pedal operation amount X4 when the automatic-brake braking command value is 0, such setting may be represented as Expression 7.

$$D(B) \times Bn(X4) + B \geq Bn(4) \quad \text{[Expression 7]}$$

Then, from Expression 7, the coefficient characteristic D(B) can be represented as Expression 8.

$$D(B) \geq 1 - \frac{B}{Bn(X4)} \quad \text{[Expression 8]}$$

In this case, the coefficient becomes 0 when the automatic-brake braking command value is equal to or more than a certain value, and the pedal operation braking command value A becomes 0 regardless of the pedal operation amount X. Thus, the minimum value Dmin of the coefficient may be set, and the coefficient characteristic D(B) may be set so as not to become equal to or less than the coefficient minimum value Dmin.

FIG. 11 is an illustration of a characteristic of the braking command value C with respect to the automatic-brake braking command value B and the pedal operation amount X. When the automatic-brake braking command value is 0, the coefficient D(B) becomes 1, and thus the automatic-brake braking command value B has a characteristic Bdn(X), which is the same as the normal brake characteristic Bn(X). On the other hand, as shown in FIG. 10, the coefficient D decreases as the automatic-brake braking command value B increases. Therefore, during the automatic brake, the pedal operation braking command value A, which is less than the normal brake characteristic, is added to the automatic-brake braking command value B to form a characteristic Bd1(X) and a characteristic Bd2(X).

In this way, according to the fourth embodiment, the automatic brake characteristic is set so as to be less than the normal brake characteristic Bn(X) by multiplying the normal brake characteristic Bn(X) by the coefficient D(B) equal to or less than 1 (less than 1). Further, the coefficient D(B) is set as a variable value, and the automatic brake characteristic is set so as to decrease depending on the magnitude of the automatic-brake braking command value, thereby setting the coefficient D(B) so that the result of addition to the automatic-brake braking command value is not less than the normal brake characteristic Bn(X).

According to the fourth embodiment, the above-mentioned automatic brake characteristic, namely, the automatic brake characteristic acquired by multiplying the normal brake characteristic Bn(X) by the coefficient D(B) equal to or less than 1 (less than 1) is used, and a basic action is not particularly different from that of the first embodiment. In other words, the fourth embodiment can suppress a sense of discomfort felt by the driver similarly to the first embodiment.

Figure 12:
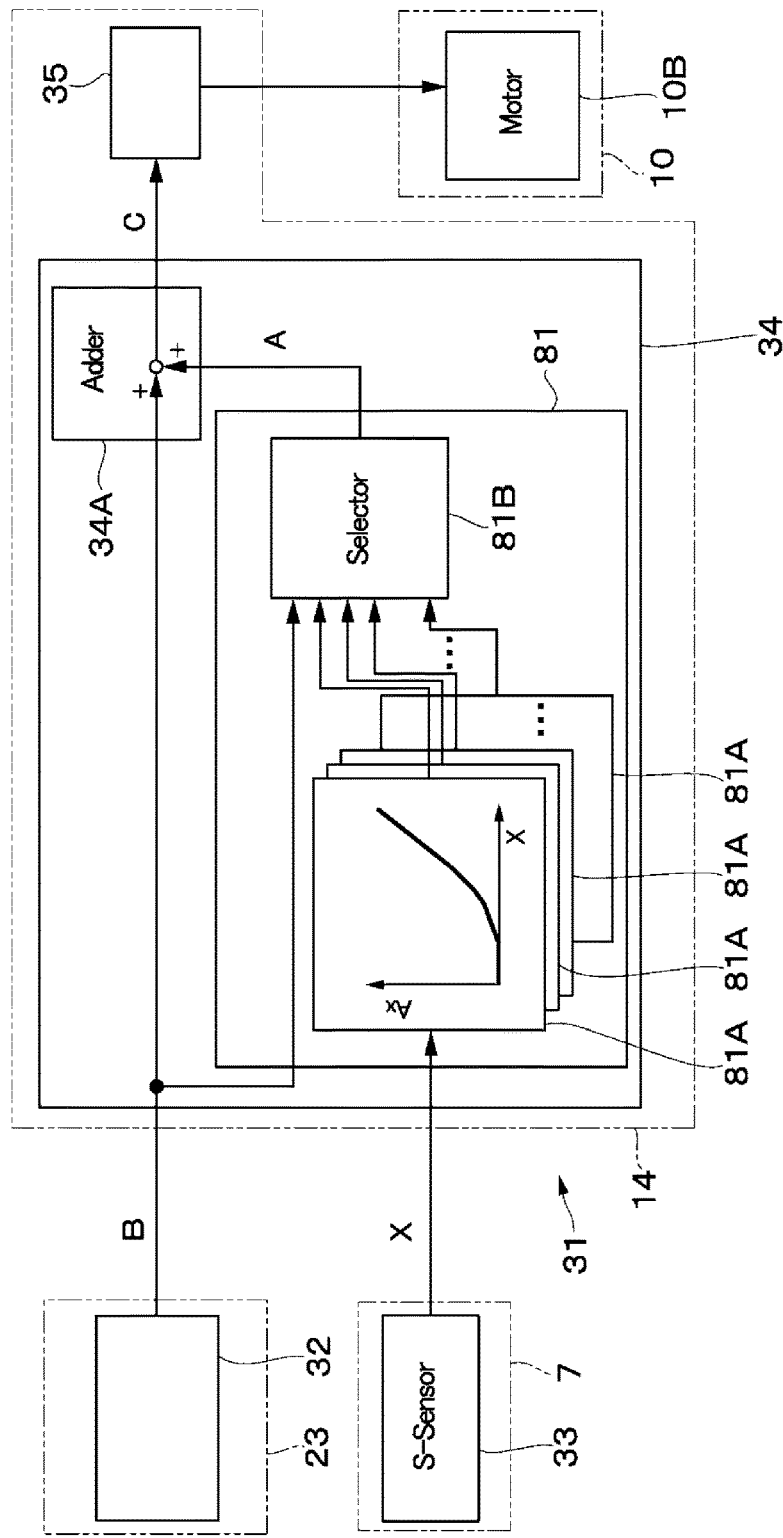
FIG. 12 is a block diagram for illustrating a brake control device according to a fifth embodiment of the present invention.

Next, FIG. 12 is an illustration of a fifth embodiment of the present invention. A feature of the fifth embodiment is that a plurality of automatic brake characteristics are provided, and a characteristic 81A to be used is changed depending on the magnitude of the automatic-brake braking command value. According to the fifth embodiment, like components of the first embodiment are denoted by like reference numerals, and a description thereof is omitted.

In FIG. 12, a pedal operation braking command calculation part 81 is used in the fifth embodiment in place of the pedal operation braking command calculation part 34B of the first embodiment. The pedal operation braking command calculation part 81 includes a plurality of brake characteristic parts 81A and a pedal operation braking command value selection part 81B.

The plurality of brake characteristic parts 81A are configured to input the pedal operation amount X from the brake pedal operation amount detection part 33. The plurality of brake characteristic parts 81A have respective brake characteristics different from one another. In this case, one brake characteristic part 81A out of the plurality of brake characteristic parts 81A may be the normal brake characteristic part 34B2 of the first embodiment having the normal brake characteristic. Moreover, the other brake characteristic parts 81A may be brake characteristic parts 81A each having a brake characteristic (automatic brake characteristic) smaller (degree of the smallness is different from one another) in a braking command value Ax corresponding to the pedal operation amount X than the normal brake characteristic.

The pedal operation braking command value selection part 81B is configured to input the automatic-brake braking command value B output from the automatic-brake braking command value calculation part 32 and the braking command values A output respectively from the plurality of brake characteristic parts 81A. The pedal operation braking command selection part 81B is configured to select which one of the outputs (braking command values Ax) of the plurality of brake characteristic parts 81A is to be output as the pedal operation braking command value A in accordance with the current automatic-brake braking command value B, and output the selected output to the braking command addition part 34A.

In other words, the pedal operation braking command value selection part 81B is configured to select one of the plurality of brake characteristics provided respectively for the plurality of brake characteristic parts 81A to be used to output the braking command value Ax corresponding to the pedal operation amount X. In this way, according to the fifth embodiment, the pedal operation braking command calculation part 81 includes the plurality of automatic brake characteristics, and is configured to change (switch) the characteristic to be used depending on the magnitude of the automatic-brake braking command value B.

The brake characteristic (automatic brake characteristic) of each of the plurality of brake characteristic parts 81A may be arbitrarily set, and may be set so that the braking command value Ax decreases with respect to the normal brake characteristic as the automatic-brake braking command value B increases. For example, the respective brake characteristic parts 81A include the brake characteristics different from one another in the degree of the decrease in the braking command value Ax corresponding to the pedal operation amount with respect to the braking command value An of the normal brake characteristic. In this case, as a method of setting the brake characteristic to be smaller than the normal brake characteristic, in addition to a method of shifting the brake characteristic toward the positive direction of the X axis representing the pedal operation amount X with respect to the normal brake characteristic, there are a method of setting the brake characteristic to be a characteristic shifted toward the negative direction of the Y axis representing the braking command value Ax, and a method of setting the brake characteristic to be a characteristic multiplied by a gain (coefficient) equal to or less than 1.

According to the above-mentioned embodiments, a sense of discomfort felt by the driver can be suppressed.

In other words, according to the embodiments, when the stepping operation is applied to the brake pedal during the automatic brake, the characteristic of the braking command value corresponding to the operation amount of the brake pedal is switched from the normal brake characteristic to the automatic brake characteristic, and the braking command value based on the automatic brake characteristic is added to the automatic-brake braking command value. In this case, the automatic brake characteristic is such a characteristic that the braking command value corresponding to the operation amount is less than that of the normal brake characteristic. Therefore, a sudden increase in the braking force (deceleration) can be suppressed compared with a case where the braking command value (braking command value based on the normal brake characteristic) corresponding to the operation amount of the brake pedal is added as it is to the automatic-brake braking command value. As a result, a sense of discomfort felt by the driver can be suppressed.

Moreover, the braking command value based on the automatic brake characteristic is added to the automatic-brake braking command value, and thus the operation amount at which the deceleration starts to increase by the brake pedal operation can be made constant independently of the magnitude of the automatic-brake braking command value. Therefore, also in this respect, a sense of discomfort felt by the driver can be suppressed. Further, the change in the automatic-brake braking command value is reflected as it is in the addition result. Therefore, for example, an increase in the automatic-brake braking command value for the collision avoidance can be reflected in an increase in the deceleration without delay independently of the operation amount of the brake pedal. As a result, for example, the braking distance can be decreased.

According to the embodiments, there is provided such a configuration that the automatic brake characteristic is set to be small so that the result of the addition of the most frequent automatic-brake braking command value to the automatic brake characteristic is the characteristic similar to the normal brake characteristic. In this case, the characteristic of the braking command value (addition result) corresponding to the operation amount of the brake pedal during the automatic brake becomes the braking characteristic of the normal brake characteristic, and thus a sense of discomfort during the brake pedal operation can be alleviated.

According to the embodiments, there is provided such a configuration that the automatic brake characteristic is set so as to be a value acquired by subtracting a predetermined amount from the braking command value corresponding to the brake pedal operation amount based on the normal brake characteristic, and to be equal to or more than 0. In this case, in a region in which the braking command value based on the automatic brake characteristic is equal to or less than a predetermined value, the automatic brake characteristic can be set so as to be the same as the characteristic in the region in which the braking command value based on the normal brake characteristic is equal to or less than the predetermined value.

According to the embodiments, there is provided such a configuration that the braking command value is set to the braking command value corresponding to the brake pedal operation amount acquired by increasing an operation amount at which the braking command value corresponding to the brake pedal operation amount based on the normal brake characteristic is more than 0 by the predetermined operation amount, thereby setting the automatic brake characteristic so as to be less than the normal brake characteristic. In this case, the predetermined operation amount is preferably set so that the result of the addition of the most frequent automatic-brake braking command value to the set automatic brake characteristic is similar to the normal brake characteristic.

According to the embodiments, there is provided such a configuration that the automatic brake characteristic is set so as to be less than the normal brake characteristic by multiplying the normal brake characteristic by the coefficient equal to or less than 1. In this case, the coefficient is preferably set so that the result of the addition of the most frequent automatic-brake braking command value to the set automatic brake characteristic is similar to the normal brake characteristic.

According to the embodiments, there is provided such a configuration that the coefficient is set to be variable, and is set so that the result of the addition to the automatic-brake braking command value is not less than the normal brake characteristic by setting the automatic brake characteristic so as to decrease in accordance with the magnitude of the automatic-brake braking command value.

According to the embodiments, there is provided such a configuration that a plurality of automatic brake characteristics are provided, and the automatic brake characteristic to be used is changed (switched) depending on the magnitude of the automatic-brake braking command value.

Further, as the brake control device according to the embodiments, for example, the following modes are conceivable.

According to a first mode of the present invention, there is provided a brake control device for controlling an electric actuator in accordance with at least one of a braking command value generated by an operation on a brake pedal and a braking command value for automatic brake in accordance with a vehicle state, thereby applying a braking force to a wheel, the brake control device including, as characteristics of the braking command value corresponding to an operation amount of the brake pedal, a normal brake characteristic and an automatic brake characteristic having a smaller braking command value corresponding to the operation amount of the brake pedal than a braking command value of the normal brake characteristic, in which, when a stepping operation is carried out on the brake pedal during the automatic brake, a braking command value based on the automatic brake characteristic is added to the braking command value for the automatic brake, and the electric actuator is controlled so as to output a braking force accompanying the operation on the brake pedal in accordance with a result of the addition.

According to a second mode of the present invention, in the first mode, the automatic brake characteristic is set to be small so that a result of addition of a most frequent automatic-brake braking command value to the automatic brake characteristic is a characteristic that is similar to the normal brake characteristic.

According to a third mode of the present invention, in the first or second mode, the automatic brake characteristic is set so as to be a value acquired by subtracting a predetermined amount from the braking command value corresponding to a brake pedal operation amount based on the normal brake characteristic, and to be equal to or more than 0.

According to a fourth mode of the present invention, in the third mode, in a region in which the braking command value based on the automatic brake characteristic is equal to or less than a predetermined value, the automatic brake characteristic is set so as to be the same as a characteristic in a region in which the braking command value based on the normal brake characteristic is equal to or less than the predetermined value.

According to a fifth mode of the present invention, in the first or second mode, the braking command value is set to a braking command value corresponding to a brake pedal operation amount acquired by increasing an operation amount at which the braking command value corresponding to the brake pedal operation amount based on the normal brake characteristic is more than 0 by a predetermined operation amount, thereby setting the automatic brake characteristic so as to be less than the normal brake characteristic.

According to a sixth mode of the present invention, in the first or second mode, the automatic brake characteristic is set so as to be less than the normal brake characteristic by multiplying the normal brake characteristic by a coefficient equal to or less than 1.

According to a seventh mode of the present invention, in the sixth mode, the coefficient is set as a variable value, and is set so that a result of the addition to the braking command value for the automatic brake is not less than the normal brake characteristic by setting the automatic brake characteristic so as to decrease in accordance with a magnitude of the automatic-brake braking command value.

According to an eighth mode of the present invention, in any one of the first to sixth modes, the automatic brake characteristic includes a plurality of the automatic brake characteristics, and one of the plurality of the automatic brake characteristics to be used is changed depending on the magnitude of the automatic-brake braking command value.

A description has been given of only some embodiments of the present invention, but it is readily understood by a person skilled in the art that various changes and improvements can be made to the exemplified embodiment without practically departing from the novel teachings and advantages of the present invention. Thus, forms to which such changes and improvements are made are also intended to be included in the technical scope of the present invention. The above-mentioned embodiments may be arbitrarily combined.

The present application claims priority based on Japanese Patent Application No. 2015-073998 filed on Mar. 31, 2015. The entire disclosure including Specification, Scope of Claims, Drawings, and Abstract of Japanese Patent Application No. 2015-073998 filed on Mar. 31, 2015 is incorporated herein by reference in their entirety.

REFERENCE SIGNS LIST 2L, 2R front wheel (wheel)
3L, 3R rear wheel (wheel)
4L, 4R front-wheel-side wheel cylinder
5L, 5R rear-wheel-side wheel cylinder
6 brake pedal
10 electric booster (electric actuator)
12 ESC (electric actuator)
21 drive motor for travel (electric actuator)
31 brake control device
32 automatic-brake braking command calculation part
33 brake pedal operation amount detection part
34 braking command calculation part
34A braking command addition part
34B2 normal brake characteristic part (normal brake characteristic)
34B3 automatic brake characteristic part (automatic brake characteristic)
35 braking force control part

The invention claimed is:

1. A brake control device for controlling an electric actuator in accordance with at least one of a braking command value generated by an operation on a brake pedal and a braking command value for automatic brake in accordance with a vehicle state, thereby applying a braking force to a wheel, the brake control device comprising, as characteristics of the braking command value corresponding to an operation amount of the brake pedal, a normal brake characteristic for calculating normal braking command values corresponding to operation amounts of the brake pedal and an automatic brake characteristic for calculating automatic braking command values corresponding to operation amounts of the brake pedal, wherein for each operation amount of the brake pedal, the automatic braking command value is smaller than the corresponding normal command value, wherein, when a stepping operation is carried out on the brake pedal during the automatic brake, a braking command value based on the automatic brake characteristic is added to the braking command value for the automatic brake, and the electric actuator is controlled so as to output a braking force accompanying the operation on the brake pedal in accordance with a result of the addition.

2. A brake control device according to claim 1, wherein the automatic brake characteristic is set to be small so that a result of addition of a most frequent automatic-brake braking command value to the automatic brake characteristic is a characteristic that is similar to the normal brake characteristic.

3. A brake control device according to claim 1, wherein the automatic brake command value is set so as to be a value acquired by subtracting a predetermined amount from the braking command value corresponding to a brake pedal operation amount based on the normal brake characteristic, and to be equal to or more than 0.

4. A brake control device according to claim 3, wherein, in a region in which the braking command value based on the automatic brake characteristic is equal to or less than a predetermined value, the automatic brake characteristic is set so as to be the same as a characteristic in a region in which the braking command value based on the normal brake characteristic is equal to or less than the predetermined value.

5. A brake control device according to claim 1, wherein the braking command value is set to a braking command value corresponding to a brake pedal operation amount acquired by increasing an operation amount at which the braking command value corresponding to the brake pedal operation amount based on the normal brake characteristic is more than 0 by a predetermined operation amount, thereby setting the automatic brake characteristic so as to be less than the normal brake characteristic.

6. A brake control device according to claim 1, wherein the automatic brake characteristic is set so as to be less than the normal brake characteristic by multiplying the normal brake characteristic by a coefficient equal to or less than 1.

7. A brake control device according to claim 6, wherein the coefficient is set as a variable value, and is set so that a result of the addition to the braking command value for the automatic brake is not less than the normal brake characteristic by setting the automatic brake characteristic so as to decrease in accordance with a magnitude of the automatic-brake braking command value.

8. A brake control device according to claim 1, wherein the automatic brake characteristic comprises a plurality of the automatic brake characteristics, and one of the plurality of the automatic brake characteristics to be used is changed depending on the magnitude of the automatic-brake braking command value.

9. A brake control device according to claim 2, wherein the automatic brake characteristic is set so as to be a value acquired by subtracting a predetermined amount from the braking command value corresponding to a brake pedal operation amount based on the normal brake characteristic, and to be equal to or more than 0.

10. A brake control device according to claim 9, wherein, in a region in which the braking command value based on the automatic brake characteristic is equal to or less than a predetermined value, the automatic brake characteristic is set so as to be the same as a characteristic in a region in which the braking command value based on the normal brake characteristic is equal to or less than the predetermined value.

11. A brake control device according to claim 2, wherein the braking command value is set to a braking command value corresponding to a brake pedal operation amount acquired by increasing an operation amount at which the braking command value corresponding to the brake pedal operation amount based on the normal brake characteristic is more than 0 by a predetermined operation amount, thereby setting the automatic brake characteristic so as to be less than the normal brake characteristic.

12. A brake control device according to claim 2, wherein the automatic brake characteristic is set so as to be less than the normal brake characteristic by multiplying the normal brake characteristic by a coefficient equal to or less than 1.

13. A brake control device according to claim 12, wherein the coefficient is set as a variable value, and is set so that a result of the addition to the braking command value for the automatic brake is not less than the normal brake characteristic by setting the automatic brake characteristic so as to decrease in accordance with a magnitude of the automatic-brake braking command value.

14. A brake control device according to claim 2, wherein the automatic brake characteristic comprises a plurality of the automatic brake characteristics, and one of the plurality of the automatic brake characteristics to be used is changed depending on the magnitude of the automatic-brake braking command value.

\* \* \* \* \*